US012779544B2

(12) United States Patent
Thiel et al.

(10) Patent No.: US 12,779,544 B2
(45) Date of Patent: Nov. 3, 2026

(54) LATHE GUARD SYSTEMS, REMOTE LATHE CONTROL SYSTEMS, AND PORTABLE LATHE ASSEMBLY KITS INCLUDING THE SAME

(71) Applicant: Climax Portable Machine Tools, Inc., Newberg, OR (US)

(72) Inventors: Scott J. Thiel, Sherwood, OR (US); Sydnee M. Hammond, Portland, OR (US); Katherine M. Forbes, Hillsboro, OR (US); Paul P.F. Burden, Macclesfield (GB)

(73) Assignee: Climax Portable Machine Tools, Inc., Newberg, OR (US)

(*) Notice: Subject to any disclaimer, the term of this patent is extended or adjusted under 35 U.S.C. 154(b) by 626 days.

(21) Appl. No.: 18/365,624

(22) Filed: Aug. 4, 2023

(65) Prior Publication Data

US 2023/0373045 A1 Nov. 23, 2023

Related U.S. Application Data

(62) Division of application No. 17/143,996, filed on Jan. 7, 2021, now abandoned.

(Continued)

(51) Int. Cl.

*B23B 25/04* (2006.01)
*B23B 3/26* (2006.01)

(52) U.S. Cl.

CPC ................ *B23B 3/26* (2013.01); *B23B 25/04* (2013.01)

(58) Field of Classification Search

CPC ...... B23Q 1/0045; B23Q 1/0009; B23Q 5/54; B23Q 5/58; B23Q 5/585; B23B 25/04;

(Continued)

(56) References Cited

U.S. PATENT DOCUMENTS

| | | | | |
|---|---|---|---|---|
| 4,656,898 A | | 4/1987 | Hunt et al. | |
| 4,663,844 A | * | 5/1987 | Vegge | B23D 21/00 30/100 |

(Continued)

FOREIGN PATENT DOCUMENTS

| | | | | |
|---|---|---|---|---|
| EP | 3038073 A1 | * | 6/2016 | G08C 17/02 |
| KR | 20020075335 A | * | 10/2002 | B23Q 1/0045 |
| WO | WO-2012155180 A1 | * | 11/2012 | B23B 3/265 |

OTHER PUBLICATIONS

H & S Tool Inc., "Split Frame Clamshell Operation and Parts Manual," Wadsworth, Ohio 44282.

*Primary Examiner* — Nicole N Ramos
(74) *Attorney, Agent, or Firm* — KOLITCH ROMANO DASCENZO GATES LLP

(57) ABSTRACT

Lathe guard systems, remote lathe control systems, and portable lathe assembly kits including the same. A lathe guard system includes a ramp guard and/or a ring guard, each configured to be operatively coupled to a portable lathe to prevent formation of a pinch point between a tripper pin tower and a tool slide assembly of the portable lathe. The ramp guard includes a ramped surface, and the ring guard at least partially overlaps the tool slide assembly to prevent the formation of a pinch point between the tripper pin tower and the tool slide assembly. Remote lathe control systems include an operator pendant configured to enable remote operation of a portable lathe and a control tether extending from the operator pendant. In some examples, a portable lathe assembly kit includes a portable lathe in combination with a lathe guard system and/or a remote lathe control system.

20 Claims, 10 Drawing Sheets

Related U.S. Application Data

(60) Provisional application No. 62/959,445, filed on Jan. 10, 2020.

(58) Field of Classification Search
CPC .... B23B 3/26; B23B 5/14; B23B 5/15; B23B 5/16; B23B 5/08; B23B 2231/28; B23B 2260/058
See application file for complete search history.

(56) References Cited

U.S. PATENT DOCUMENTS

| | | | | |
|---|---|---|---|---|
| 4,939,964 | A * | 7/1990 | Ricci | G21C 17/017 82/113 |
| 8,250,953 | B2 | 8/2012 | Hall et al. | |
| 8,584,557 | B2 | 11/2013 | Hall et al. | |
| 9,272,340 | B1 * | 3/2016 | Smith | B23C 1/20 |
| 10,413,971 | B1 * | 9/2019 | Smith | B23B 29/025 |
| 2005/0247171 | A1 * | 11/2005 | Kawashima | B23B 3/26 82/113 |
| 2015/0053055 | A1 * | 2/2015 | Schammel | B23B 3/26 83/13 |
| 2017/0326696 | A1 * | 11/2017 | Halverson | B23D 59/001 |
| 2021/0016356 | A1 | 1/2021 | Thompson | |

* cited by examiner

LATHE GUARD SYSTEMS, REMOTE LATHE CONTROL SYSTEMS, AND PORTABLE LATHE ASSEMBLY KITS INCLUDING THE SAME

RELATED APPLICATIONS

This application is a divisional of and claims priority to U.S. patent application Ser. No. 17/143,996, entitled "LATHE GUARD SYSTEMS, REMOTE LATHE CONTROL SYSTEMS, AND PORTABLE LATHE ASSEMBLY KITS INCLUDING THE SAME," and filed on Jan. 7, 2021, which claims priority to U.S. Provisional Patent Application No. 62/959,445, entitled "LATHE GUARD SYSTEMS AND PORTABLE LATHES INCLUDING THE SAME," and filed on Jan. 10, 2020, the complete disclosures of which are hereby incorporated by reference.

FIELD

The present disclosure relates to lathe guard systems, remote lathe control systems, and portable lathe assembly kits including the same.

BACKGROUND

Portable lathes are specialized machine tools that are configured to be installed directly onto a workpiece for machining thereof. Some portable lathes include a fixed ring that is configured to be fixedly coupled to the workpiece and a rotating ring that is configured to rotate relative to the fixed ring to move a tool bit around an outer surface of the workpiece. In addition, some portable lathes include a mechanism for automatically advancing the tool bit toward the workpiece as the rotating ring rotates relative to the fixed ring. For example, some portable lathes include one or more tool holders of various sizes that may be adjusted in a radial direction to accommodate workpieces of various diameters. However, such tool holders can create a potential pinch point between components of the fixed ring and the rotating tool holder.

SUMMARY

Lathe guard systems, remote lathe control systems, and portable lathe assembly kits including the same are disclosed herein. The lathe guard systems and remote lathe control systems are utilized in conjunction with a portable lathe that includes a fixed ring, a rotating ring, a drive motor, a tool slide assembly, and a tripper pin tower. The fixed ring is configured to be fixedly mounted on a cylindrical workpiece that extends along a workpiece longitudinal axis. The rotating ring is rotatably and operatively coupled to the fixed ring. The drive motor is configured to rotate the rotating ring relative to the fixed ring during operative use of the portable lathe. The tool slide assembly is mounted to the rotating ring and includes a tool bit and/or a star wheel. The tripper pin tower is fixedly coupled to and extending radially away from the fixed ring and including a tripper pin. A lathe guard system includes a ramp guard configured to be operatively mounted proximate to the tripper pin tower and/or a ring guard configured to be operatively coupled to the fixed ring or to the rotating ring. The ramp guard includes a ramped surface extending at least partially oblique to an outer circular surface of the portable lathe, and is configured to prevent the formation of a pinch point between the tripper pin tower and the tool slide assembly as the rotating ring rotates relative to the fixed ring during operative use of the portable lathe. The ring guard extends radially outward relative to the fixed ring and at least partially overlaps the tool slide assembly to prevent the formation of a pinch point between the tripper pin tower and the tool slide assembly as the rotating ring rotates relative to the fixed ring during operative use of the portable lathe.

Remote lathe control systems include an operator pendant configured to receive a user input from a human user and to generate a control signal for remote operation of the portable lathe, and a control tether extending from the operator pendant to convey the control signal to another component of the remote lathe control system.

In some examples, a portable lathe assembly kit includes a portable lathe in combination with a lathe guard system and/or a remote lathe control system.

DESCRIPTION

Figure 1:
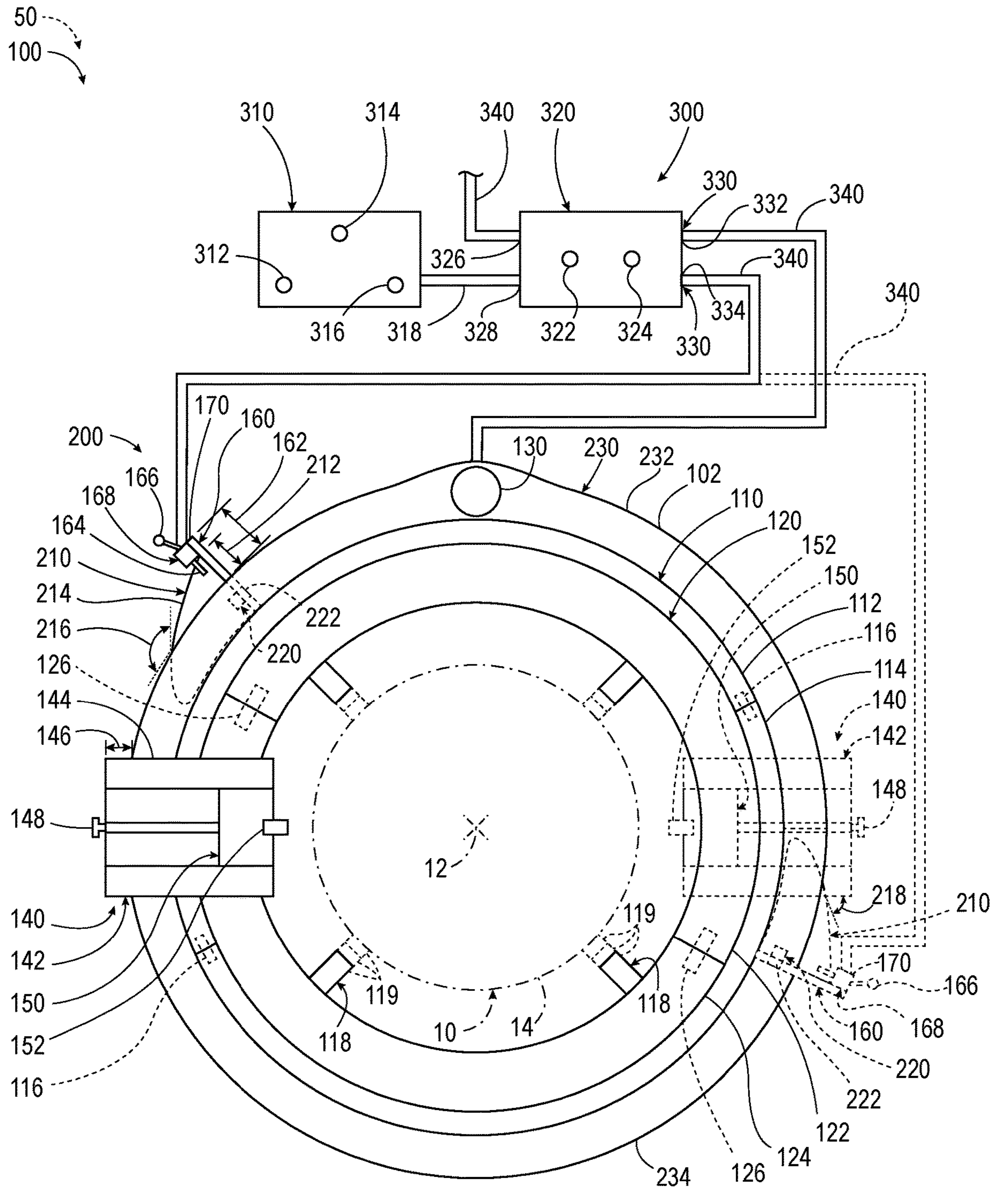
FIG. 1 is a schematic front elevation view of examples of portable lathes, portable lathe assembly kits, lathe guard systems, and remote lathe control systems according to the present disclosure.

FIGS. 1-13 provide examples of portable lathes 100, lathe guard systems 200, remote lathe control systems 300, and/or portable lathe assembly kits 50 including the portable lathes, the lathe guard systems, and/or the remote lathe control systems, according to the present disclosure. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure. Additionally, in some instances, elements that are likely to be included in a particular embodiment but that are concealed from view also are illustrated in dashed lines.

The present disclosure generally relates to lathe guard systems 200 and/or remote lathe control systems 300 that may be utilized in conjunction with portable lathes 100, such as conventional portable lathes as described herein. In some examples, however, portable lathe 100 may be described as including lathe guard system 200, remote lathe control system 300, and/or any suitable component(s) thereof. Stated differently, references herein to portable lathe 100 also may be understood as referring to and/or encompassing any components of lathe guard system 200 and/or of remote lathe control system 300 that are utilized in conjunction with portable lathe 100.

Figure 2:
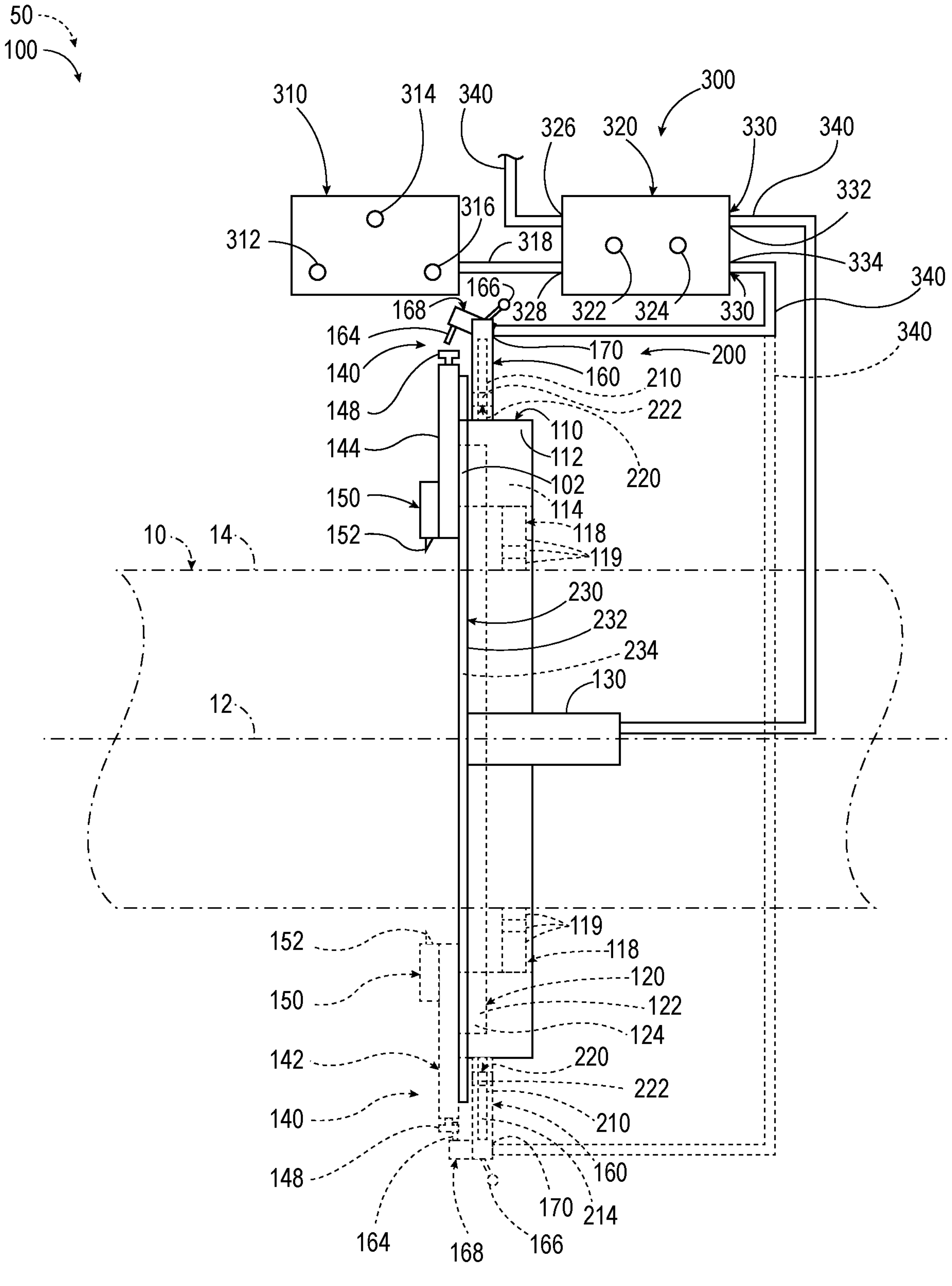
FIG. 2 is a schematic top plan view of examples of portable lathes, portable lathe assembly kits, lathe guard systems, and remote lathe control systems according to the present disclosure.

FIGS. 1-2 schematically illustrate examples of portable lathes 100, of lathe guard systems 200, of remote lathe control systems 300, and/or of portable lathe assembly kits 50 including the portable lathes 100, the lathe guard systems 200, and/or the remote lathe control systems 300 according to the present disclosure. In particular, FIG. 1 is a schematic front elevation view of examples of portable lathes 100, while FIG. 2 is a schematic top plan view of examples of portable lathes 100. FIGS. 3-12 are less schematic illustrations of an example portable lathe 1000, which is an example of portable lathe 100 that includes lathe guard system 200 and remote lathe control system 300, while FIG. 13 is a schematic representation of a component of remote lathe control system 300 of example portable lathe 1000, as described in more detail herein.

Figure 5:
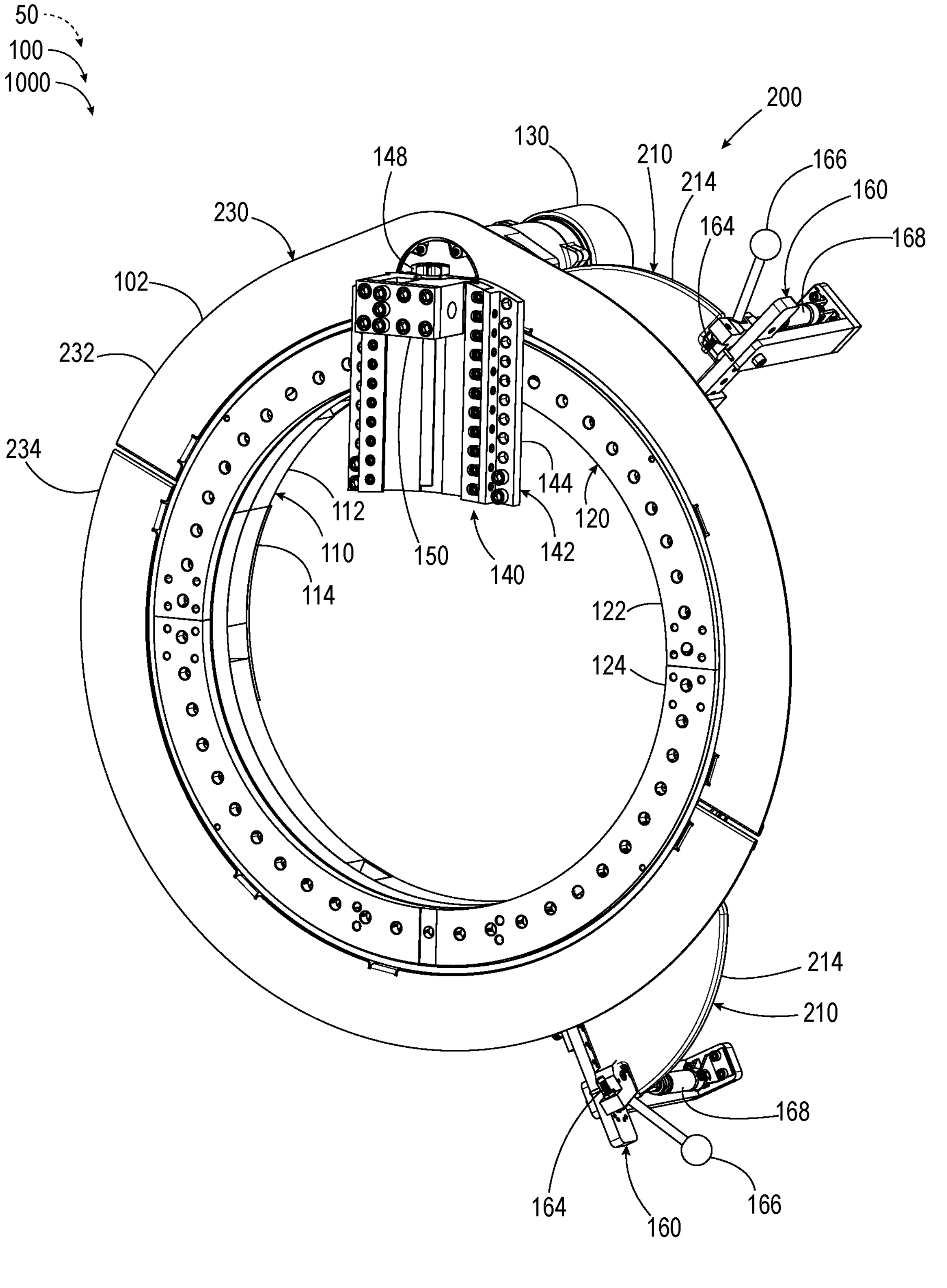
FIG. 5 is a front-side isometric view of the example portable lathe and lathe guard system of FIGS. 3-4.
Figure 6:
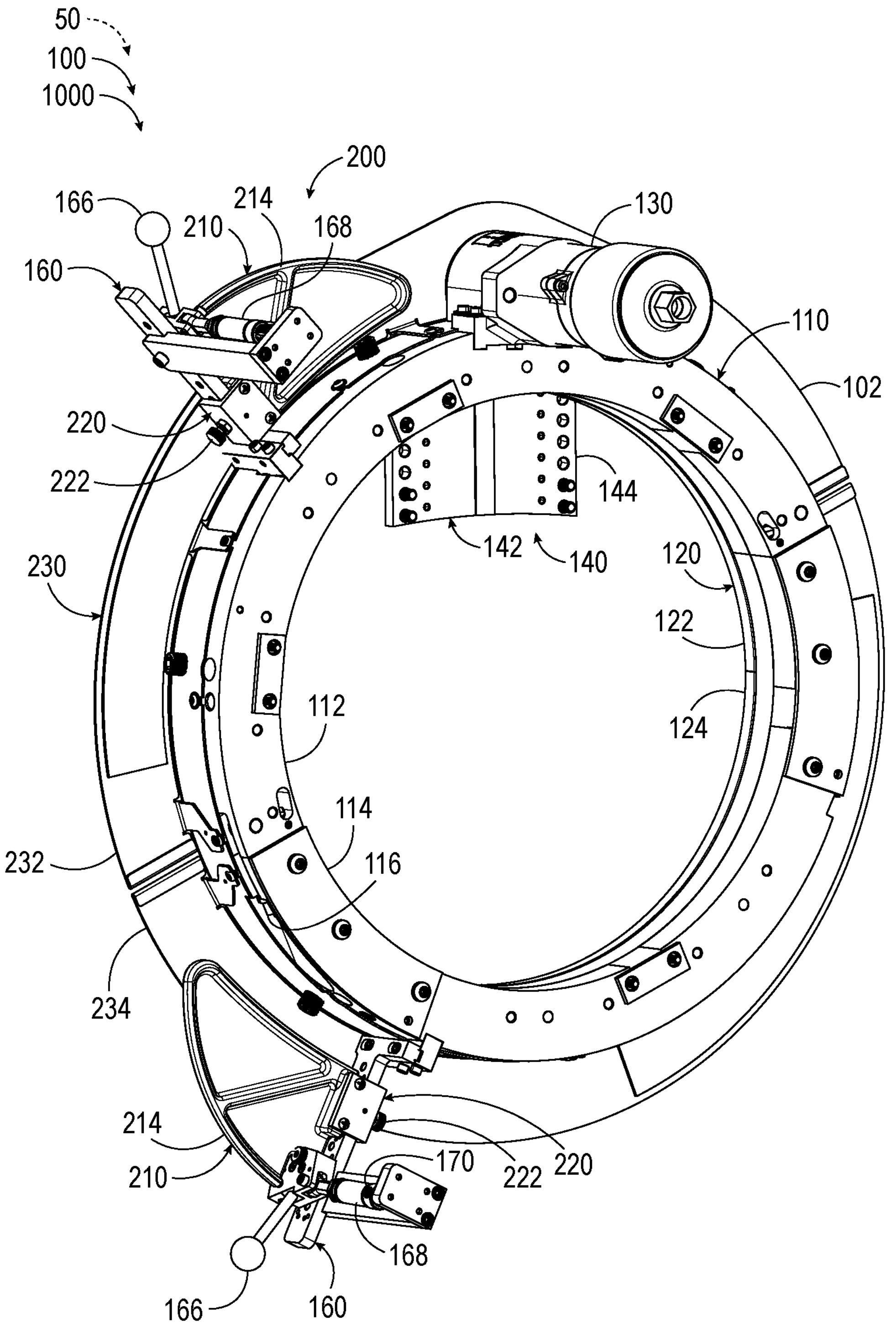
FIG. 6 is a rear-side isometric view of the example portable lathe and lathe guard system of FIGS. 3-5.

As schematically illustrated in FIGS. 1-2, and as less schematically illustrated at least in FIGS. 5-6, a portable lathe 100 includes a fixed ring 110 and a rotating ring 120 operatively coupled to fixed ring 110 such that rotating ring 120 rotates relative to fixed ring 110 during operative use of portable lathe 100. More specifically, and as schematically illustrated in FIGS. 1-2, portable lathe 100 is configured to be mounted on a cylindrical workpiece 10 that extends along a workpiece longitudinal axis 12 such that rotating ring 120 rotates relative to each of fixed ring 110 and cylindrical workpiece 10 about workpiece longitudinal axis 12 during operative use of portable lathe 100. As schematically illustrated in FIGS. 1-2 and less schematically illustrated at least in FIGS. 3-6, and as described in more detail herein, portable lathe 100 includes a tool slide assembly 140 with a tool bit 152 mounted to rotating ring 120. During operative use of portable lathe 100, the rotation of rotating ring 120 causes tool slide assembly 140 to revolve around cylindrical workpiece 10 such that tool bit 152 revolves around and machines an exterior surface 14 of the cylindrical workpiece. As more specific examples, tool bit 152 may be configured to cut, mill, sever, bevel, and/or resurface exterior surface 14 of cylindrical workpiece 10. Tool bit 152 may include and/or be any of a variety of tools for machining exterior surface 14 of cylindrical workpiece 10, examples of which include a cutting edge, a single-point cutting tool, a chiseled cutting tool, and/or a lathe tool bit.

As described in more detail herein, the rotation of rotating ring 120 relative to fixed ring 110 during operative use of portable lathe 100 may yield a potentially hazardous environment, in which a user must take care to avoid injury relating to a motion of rotating ring 120 while manipulating and/or adjusting aspects of portable lathe 100. In particular, distractions, operator error, deviation from best practices, or adverse chance events in the work environment may lead to worker injuries during operative use of conventional portable lathes. To mitigate against these hazards, as schematically illustrated in FIGS. 1-2 and as described in more detail herein, portable lathe 100 may be utilized in conjunction with a lathe guard system 200 that is configured to reduce a risk of injury resulting from motion of rotating ring 120 and/or a remote lathe control system 300 that is configured to facilitate remote operation of portable lathe 100.

As used herein, portable lathe 100, lathe guard system 200, remote lathe control system 300, and/or any components thereof may be described as being in "operative use" and/or as being "operatively utilized" when the systems and/or components are utilized with portable lathe 100 in an assembled and operative form and while portable lathe 100 operatively engages cylindrical workpiece 10. In some more specific examples, remote lathe control system 300, and/or any components thereof may be described as being in "operative use" and/or as being "operatively utilized" when the systems and/or components are utilized while rotating ring 120 rotates relative to fixed ring 110. However, while the present disclosure generally describes examples in which portable lathe 100 is operatively mounted upon cylindrical workpiece 10, such examples are not intended to be limiting, and it is within the scope of the present disclosure that portable lathe 100 and/or components thereof are not always operatively coupled to and/or operatively utilized in conjunction with cylindrical workpiece 10. Stated differently, while the present disclosure generally relates to examples in which portable lathe 100 is assembled and operatively mounted on cylindrical workpiece 10, it is within the scope of the present disclosure that any applicable descriptions of components, features, functionalities, etc. of portable lathe 100 and/or of any component thereof also pertain to examples in which portable lathe 100 is at least partially disassembled and/or not operatively coupled to cylindrical workpiece 10.

Portable lathe 100 may have any of a variety of configurations for supporting and/or effecting the rotation of rotating ring 120 relative to fixed ring 110. In some examples, and as schematically illustrated in FIGS. 1-2 and less schematically illustrated at least in FIG. 5, rotating ring 120 is at least partially enclosed by fixed ring 110, such that the rotating ring is positioned radially inward of at least a portion of the fixed ring. In some examples, and as schematically illustrated in FIGS. 1-2 and less schematically illustrated in FIGS. 3-6, portable lathe 100 includes a drive motor 130 that is configured to rotate rotating ring 120 relative to fixed ring 110. In some such examples, drive motor 130 is fixedly coupled to fixed ring 110. Drive motor 130 may include and/or be any of a variety of motors, examples of which include a pneumatic motor, an electric motor, and/or a hydraulic motor.

Portable lathe 100 may be configured to support, and/or to be operatively mounted upon, cylindrical workpiece 10 in any of a variety of manners. In some examples, and as schematically illustrated in FIGS. 1-2, portable lathe 100 includes a plurality of locator pads 118 operatively coupled to fixed ring 110 and configured to engage exterior surface 14 of cylindrical workpiece 10 to mount the portable lathe upon the cylindrical workpiece. In particular, and as schematically illustrated in FIG. 1, locator pads 118 may be circumferentially distributed around cylindrical workpiece 10 at a plurality of mounting locations to fixedly mount fixed ring 110 upon the cylindrical workpiece. In some examples, and as schematically illustrated in FIGS. 1-2, the plurality of locator pads 118 includes a plurality of extension pads 119 that are configured to be arranged in a stacked configuration to incrementally adjust a position of cylindrical workpiece 10 relative to fixed ring 110. Stated differently, in such examples, at least a subset of the locator pads 118 extending between cylindrical workpiece 10 and fixed ring 110 at each mounting location are extension pads 119 that are stacked to yield an overall thickness corresponding to a diameter of the cylindrical workpiece to be machined. In this manner, portable lathe 100 may be configured to be utilized in conjunction with cylindrical workpieces 10 of a variety of diameters.

In some examples, it may be desirable to selectively vary a radial distance between exterior surface 14 and tool bit 152 during operative use of portable lathe 100 to vary a depth at which the tool bit machines cylindrical workpiece 10, such as while rotating ring 120 continues to rotate relative to fixed ring 110. Accordingly, and as schematically illustrated in FIGS. 1-2 and less schematically illustrated at least in FIGS. 3-7, portable lathe 100 includes at least one tripper pin tower 160 fixedly coupled to fixed ring 110 and including a tripper pin 164 for adjusting a radial position of tool bit 152 relative to cylindrical workpiece 10. More specifically, in some examples, and as schematically illustrated in FIGS. 1-2 and less schematically illustrated in FIGS. 3-6, tool slide assembly 140 includes a tool slide mount 142 operatively coupled to rotating ring 120 and a tool slide 150 adjustably supported by the tool slide mount, and tool bit 152 (shown in FIGS. 1-2) is fixedly coupled to tool slide 150. In such examples, tool slide 150 is configured to be selectively radially translated relative to tool slide mount 142 to adjust a radial position of tool bit 152 relative to cylindrical workpiece 10 during operative use of portable lathe 100. More specifically, in some such examples, and as schematically illustrated in FIGS. 1-2 and less schematically illustrated in FIGS. 3-5, tool slide assembly 140 additionally includes a star wheel 148 rotatably coupled to tool slide mount 142 such that rotating the star wheel operates to radially translate tool slide 150 relative to the tool slide mount. In such examples, tripper pin 164 may be selectively positioned to engage and rotate star wheel 148 relative to tool slide mount 142 as tool slide assembly 140 rotates past tripper pin tower 160, thereby incrementally advancing tool bit 152 toward cylindrical workpiece 10. In this manner, the interaction between tripper pin 164 and star wheel 148 may be described as operating to advance tool bit 152 toward cylindrical workpiece 10 at least partially automatically.

As used herein, terms such as "radial," "radially," and the like as used to describe a direction of extent and/or motion, generally refer to directions relative to workpiece longitudinal axis 12 of cylindrical workpiece 10 during operative use of portable lathe 100. Accordingly, a first component may be descried as moving radially inward, or radially toward a second component, when the first component moves nearer to workpiece longitudinal axis 12. Similarly, a first component may be described as extending radially away from a second component when the first component extends from the second component along a direction that is at least substantially perpendicular to workpiece longitudinal axis 12 and that is directed away from the workpiece longitudinal axis. In an example in which portable lathe 100 is not operatively assembled upon cylindrical workpiece 10, terms such as "radial," "radially," and the like may be understood as describing directions relative to a central axis of the portable lathe that is collinear with longitudinal axis 12 during operative use of the portable lathe.

Figure 7:
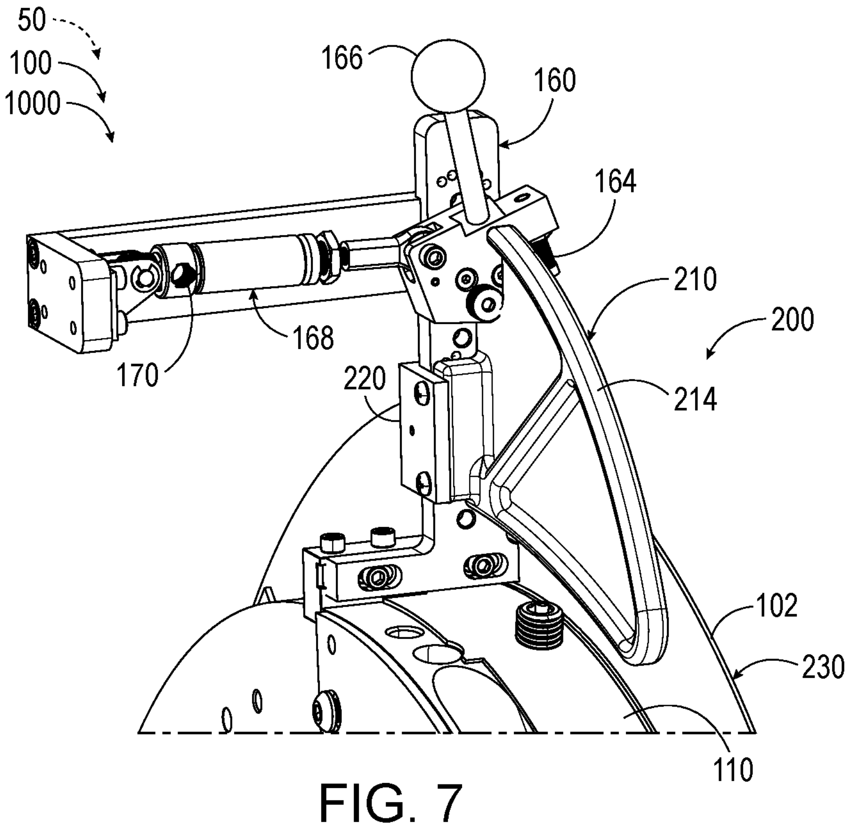
FIG. 7 is a rear top-side isometric view of a tripper pin tower and a ramp guard of the example portable lathe and lathe guard system of FIGS. 3-6.
Figure 8:
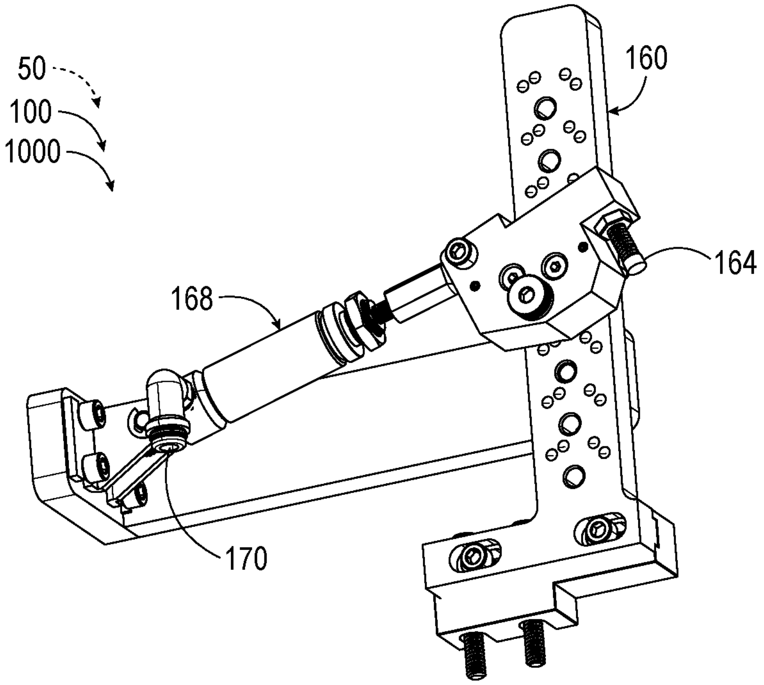
FIG. 8 is front bottom-side isometric view of the tripper pin tower of FIG. 7.
Figure 9:
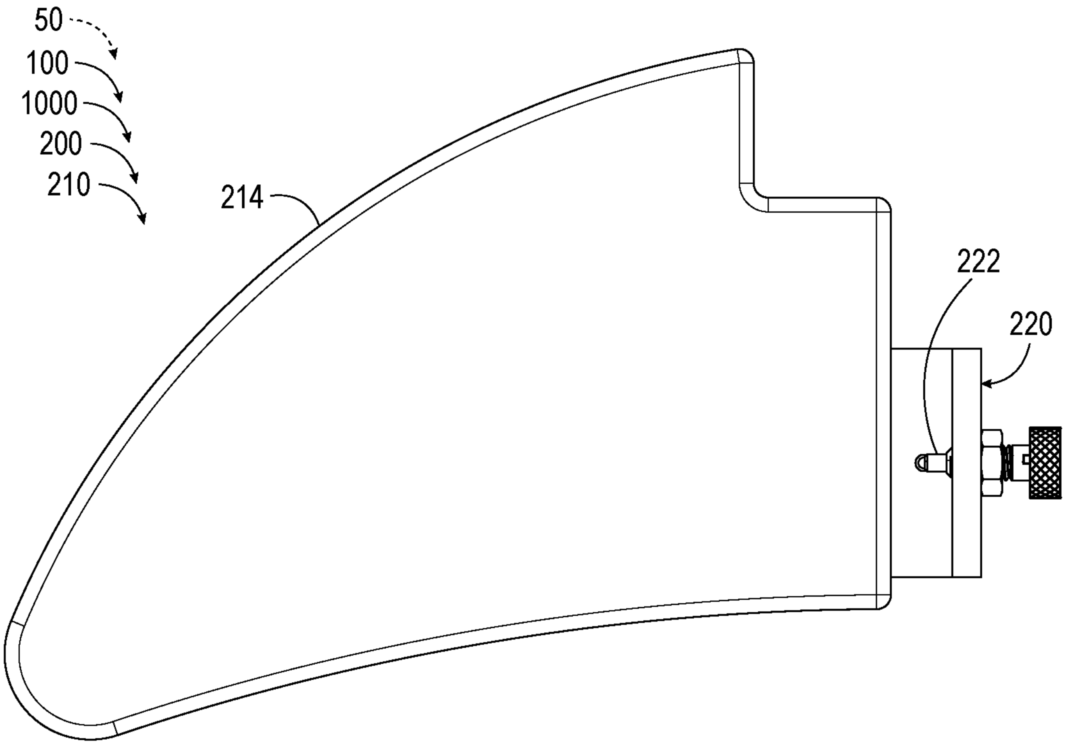
FIG. 9 is a front elevation view of the ramp guard of FIG. 7.
Figure 10:
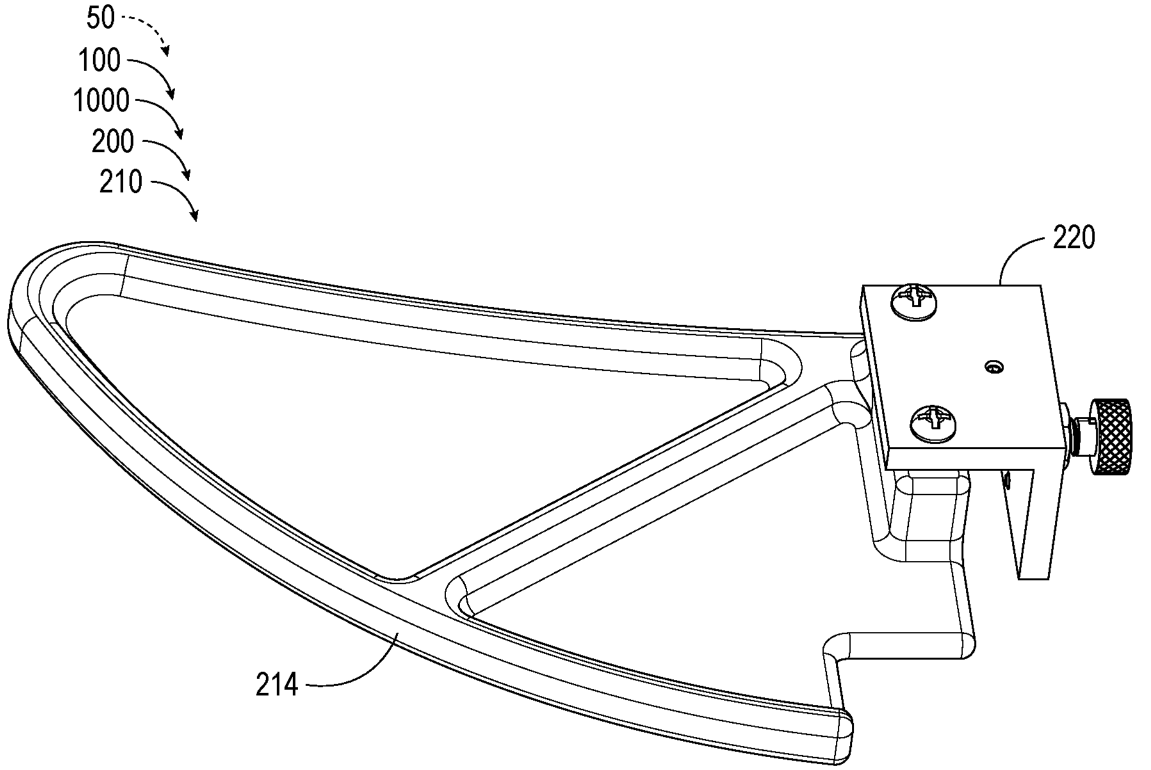
FIG. 10 is a rear top isometric view of the ramp guard of FIGS. 7 and 9.
Figure 11:
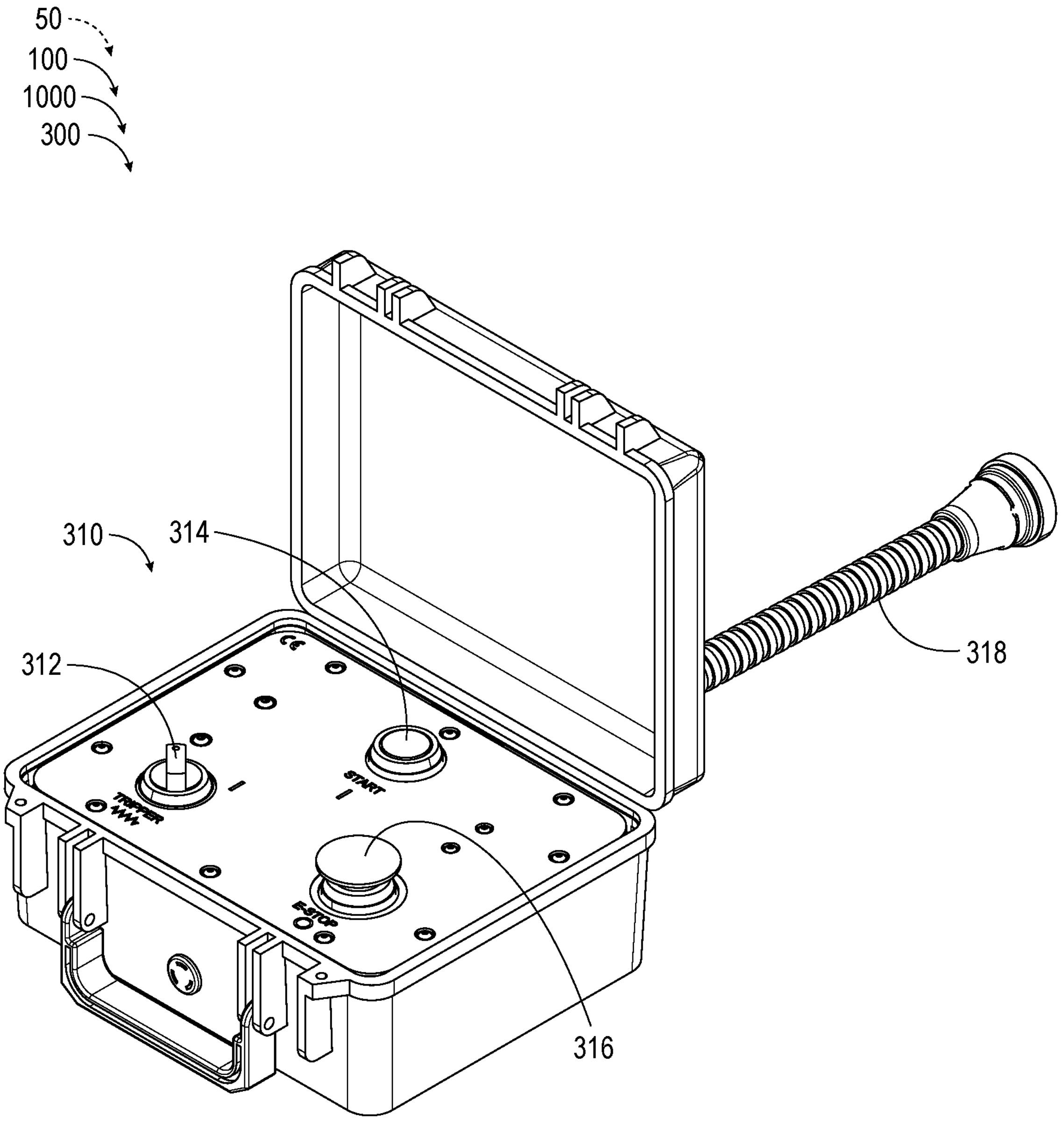
FIG. 11 is a front-side isometric view of an example of an operator pendant according to the present disclosure.

As discussed, tool slide assembly 140 may be configured such that engagement between tripper pin 164 and star wheel 148 incrementally advances tool bit 152 toward cylindrical workpiece 10 while rotating ring 120 rotates relative to fixed ring 110. However, once tool bit 152 reaches a desired radial position for machining cylindrical workpiece 10, it may be desirable to cease incrementally advancing the tool bit toward cylindrical workpiece 10. Accordingly, in some examples, tripper pin 164 may be configured to be selectively disabled from engagement with star wheel 148 such that rotation of rotating ring 120 ceases to radially translate tool bit 152. More specifically, in such examples, tripper pin 164 is configured to be selectively transitioned between an activated configuration and a disabled configuration. When the tripper pin is in the activated configuration (schematically illustrated in dashed lines in the lower portion of FIG. 2), the tripper pin is positioned to rotate star wheel 148 as tool slide assembly 140 moves past tripper pin tower 160 during operative use of portable lathe 100. When the tripper pin is in the disabled configuration (schematically illustrated in solid lines in the upper portion of FIG. 2), the tripper pin is positioned to be spaced apart from the star wheel when the tool slide assembly moves past the tripper pin tower during operative use of the portable lathe. Thus, when tripper pin 164 is in the activated configuration, the tripper pin will operate to rotate star wheel 148 when tool slide assembly 140 rotates past tripper pin tower 160, thereby incrementally advancing tool bit 152 toward cylindrical workpiece 10. FIGS. 7-8 additionally illustrate examples in which tripper pin 164 is in the disabled configuration.

In some examples, and as schematically illustrated in solid lines in FIGS. 1-2, portable lathe 100 incudes a single tripper pin tower 160 with a single respective tripper pin 164. In such examples, during operative use of portable lathe 100, positioning tripper pin 164 in the activated configuration results in tool bit 152 incrementally advancing toward cylindrical workpiece 10 once with each revolution of rotating ring 120 relative to fixed ring 110 (i.e., each time tool slide assembly 140 and star wheel 148 move past tripper pin tower 160). Accordingly, in such examples, an average rate at which tool bit 152 advances toward cylindrical workpiece 10 may directly correspond to a rotation rate of rotating ring 120 relative to fixed ring 110. Alternatively, positioning tripper pin 164 in the disabled configuration results in tool bit 152 remaining at a fixed radial distance from cylindrical workpiece 10 as rotating ring 120 rotates relative to fixed ring 110.

In other examples, and as schematically illustrated in solid and dashed lines in FIGS. 1-2 and less schematically illustrated in FIGS. 3-6, portable lathe 100 includes a plurality of tripper pin towers 160, each with a respective tripper pin 164, such that tool bit 152 (shown in FIGS. 1-2) may incrementally advance toward cylindrical workpiece 10 a corresponding plurality of times during each revolution of rotating ring 120. As examples, portable lathe 100 may include up to eight tripper pin towers 160 with respective tripper pins 164. However, it is additionally within the scope of the present disclosure that portable lathe 100 includes any appropriate number of tripper pin towers 160, such as more than eight tripper pin towers or fewer than eight tripper pin towers. In such examples, each of the respective tripper pins 164 may be selectively and independently transitioned between the activated configuration and the disabled configuration. For example, the number of tripper pins 164 that are positioned in the activated configuration may be proportional to a feed rate at which tool bit 152 advances toward cylindrical workpiece 10 during each revolution of rotating ring 120.

Additionally or alternatively, and as additionally schematically illustrated in solid and dashed lines in FIGS. 1-2, portable lathe 100 may include a plurality of tool slide assemblies 140, each with a respective tool bit 152, such as to increase a rate at which the portable lathe machines cylindrical workpiece 10 at a given rotational velocity of rotating ring 120. In such examples, each tool slide assembly 140 may include a respective star wheel 148 for incrementally advancing the respective tool bit 152 toward cylindrical workpiece 10.

In some examples, tripper pin 164 is configured to be selectively manually transitioned between the activated configuration and the disabled configuration while rotating ring 120 is actively rotating, such as to cease radial translation of tool bit 152 when the tool bit reaches a desired radial position relative to cylindrical workpiece 10. For example, and as schematically illustrated in FIGS. 1-2 and less schematically illustrated in FIGS. 3-7, tripper pin tower 160 may include a tripper activation lever 166 that is configured to be selectively actuated by a user to selectively transition tripper pin 164 between the activated configuration and the disabled configuration, such as by pivoting the tripper pin relative to the tripper pin tower. However, when manually actuating tripper pin 164 and/or tripper activation lever 166, a user generally must take care to avoid inadvertently placing a body part (such as a hand and/or finger) in a region between tool slide assembly 140 and tripper pin tower 160 or between the tool slide assembly and drive motor 130 that may form a pinch point as rotating ring 120 rotates relative to fixed ring 110. Accordingly, as schematically illustrated in FIGS. 1-2 and less schematically illustrated in FIGS. 3-7 and 9-10, and as described in more detail herein, portable lathe 100 may be utilized in conjunction with a lathe guard system 200 configured to avoid and/or prevent the formation of such pinch points, thereby protecting the user from injury.

Lathe guard system 200 may include any of a variety of components for avoiding and/or preventing the formation of pinch points as described above. In some examples, and as shown in FIGS. 1, 3-7, and 9-10, lathe guard system 200 includes one or more ramp guards 210, each ramp guard configured to be operatively coupled to, coupled relative to, mounted proximate to, mounted relative to, and/or otherwise associated with a corresponding tripper pin tower 160 (shown in FIGS. 1 and 3-7). In particular, and as described in more detail herein, each ramp guard 210 is configured to prevent the formation of a pinch point between tool slide assembly 140 and tripper pin tower 160, and/or between the tool slide assembly and drive motor 130, as rotating ring 120 rotates relative to fixed ring 110 by urging an inadvertently placed body part away from such a pinch point.

Additionally or alternatively, and as schematically illustrated in FIGS. 1-2 and less schematically illustrated in FIGS. 3-7, lathe guard system 200 may include a ring guard 230 that is configured to be operatively coupled to fixed ring 110 or to rotating ring 120 and that extends radially outward relative to the fixed ring. In particular, and as described in more detail herein, ring guard 230 is configured to at least partially overlap tool slide mount 142 during operative use of portable lathe 100. In this manner, ring guard 230 may be configured to prevent the formation of a pinch point between tool slide assembly 140 and tripper pin tower 160, and/or between the tool slide assembly and drive motor 130, as rotating ring 120 rotates relative to fixed ring 110 by at least partially occupying a region that otherwise may produce a pinch point.

Figure 3:
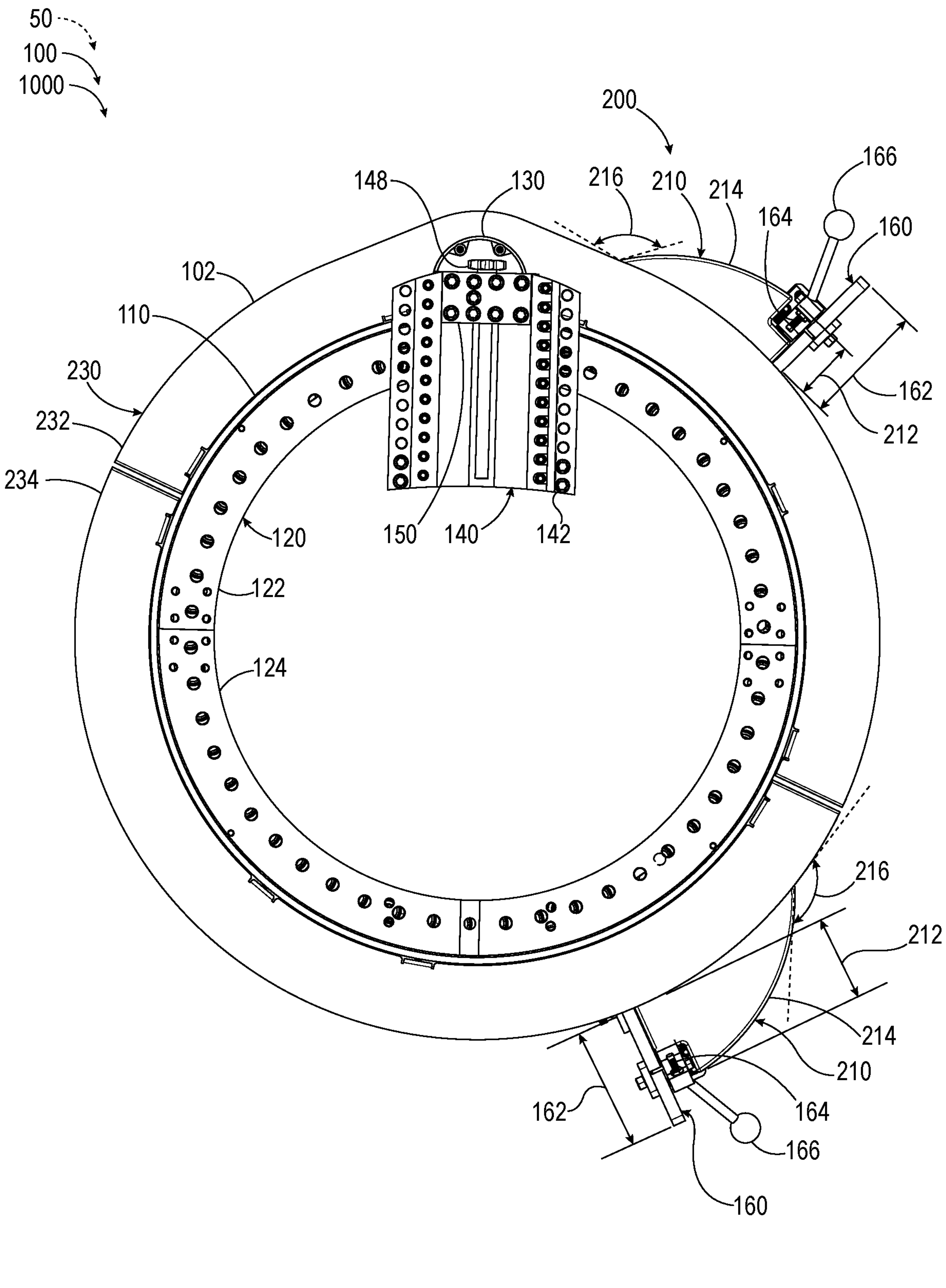
FIG. 3 is a front elevation view of an example of a portable lathe and a lathe guard system according to the present disclosure.
Figure 4:
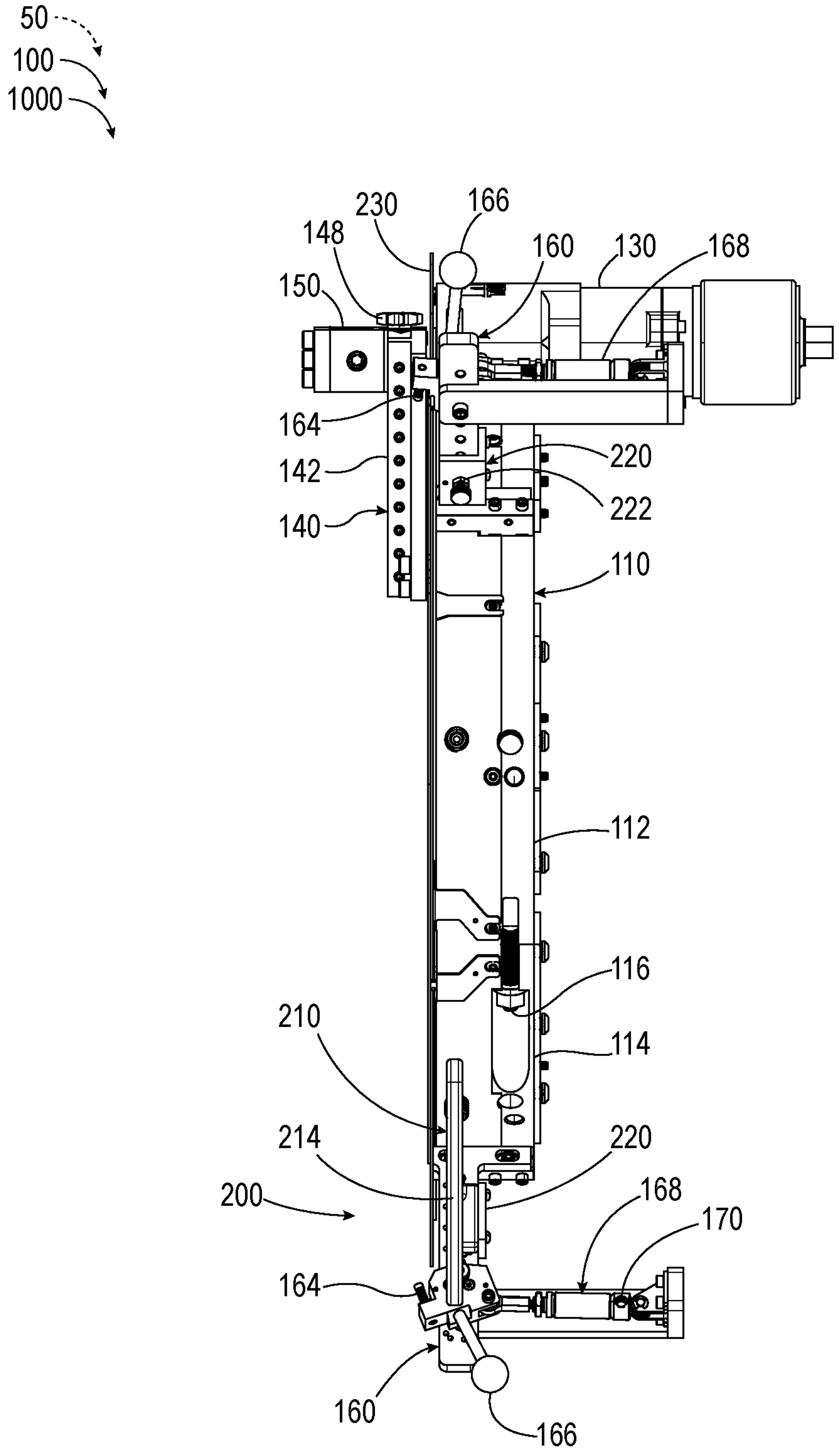
FIG. 4 is a side elevation view of the example portable lathe and lathe guard system of FIG. 3.

When present, and as schematically illustrated in FIGS. 1-2 and less schematically illustrated at least in FIGS. 3 and 5-6, each ramp guard 210 includes a ramped surface 214 that extends at least partially oblique to an outer circular surface 102 of portable lathe 100. As used herein, outer circular surface 102 may refer to any continuous surface and/or portion of portable lathe 100 and/or of lathe guard system 200 that is radially distal workpiece longitudinal axis 12, such as a surface and/or portion that is at least substantially circular when viewed along the workpiece longitudinal axis. As examples, outer circular surface 102 may include and/or be at least a portion of an outer circumference of fixed ring 110, of rotating ring 120, and/or (as illustrated in FIGS. 1-3 and 5-7) of ring guard 230. In this manner, as tool slide assembly 140 approaches tripper pin tower 160 during rotation of rotating ring 120, the tool slide assembly first moves past the corresponding ramp guard 210 such that ramped surface 214 urges any errant limb or extremity of the user away from the region between tool slide mount 142 and tripper pin tower 160 if the tool slide assembly engages such an errant limb or extremity.

Ramp guard 210 may feature any of a variety of structures and/or configurations for preventing the formation of a pinch point between tool slide mount 142 and tripper pin tower 160, and/or between tool slide mount 142 and drive motor 130, during operative use of portable lathe 100. For example, and as schematically illustrated in FIG. 1 and less schematically illustrated in FIG. 3, ramp guard 210 may be characterized in terms of a ramp guard height 212 by which the ramp guard extends radially away from outer circular surface 102. More specifically, and as schematically illustrated in FIG. 1 and less schematically illustrated in FIG. 3, ramp guard height 212 may correspond to a distance between outer circular surface 102 and an outer extremity of ramp guard 210 along a direction perpendicular to workpiece longitudinal axis 12. In some examples, ramp guard 210 is configured such that ramp guard height 212 corresponds to and/or exceeds a dimension of one or more other components of portable lathe 100. For example, and as schematically illustrated in FIG. 1, tool slide mount 142 may include at least one mount edge 144 that extends radially away from outer circular surface 102 by a mount height 146, as measured between outer circular surface 102 and an outer extremity of the mount edge along a direction perpendicular to longitudinal axis 12, and ramp guard 210 may be configured such that ramp guard height 212 is equal to or greater than the mount height. As another example, and as schematically illustrated in FIG. 1 and less schematically illustrated in FIG. 3, each tripper pin tower 160 may extend radially away from outer circular surface 102 by a tower height 162, as measured between outer circular surface 102 and an outer extremity of the tripper pin tower along a direction perpendicular to workpiece longitudinal axis 12, and ramp guard 210 may be configured such that ramp guard height 212 is equal to or greater than the tower height. In some examples, ramp guard 210 is configured such that ramp guard height 212 is equal to or greater than the smaller of mount height 146 and tower height 162.

Ramp guard 210 additionally or alternatively may be characterized by one or more angles formed between the ramp guard and one or more other components of portable lathe 100 and/or of lathe guard system 200. As an example, and as schematically illustrated in FIG. 1 and less schematically illustrated in FIG. 3, ramped surface 214 may form a ramp guard tangent angle 216 with outer circular surface 102, such as may be measured between a line tangent to ramped surface 214 and a line tangent to outer circular surface 102 as viewed along a direction parallel to workpiece longitudinal axis 12. As more specific examples, ramp guard tangent angle 216 may be at least 100 degrees, at least 120 degrees, at least 140 degrees, at least 160 degrees, at most 180 degrees, at most 170 degrees, at most 150 degrees, at most 130 degrees, and/or at most 110 degrees.

As another example, and as additionally schematically illustrated in FIG. 1, ramped surface 214 may form a ramp guard radial angle 218 with mount edge 144 of tool slide mount 142 as the tool slide mount moves past ramp guard 210. In such examples, and as schematically illustrated in FIG. 1, ramp guard radial angle 218 may be measured between a line tangent to ramped surface 214 and a line tangent to mount edge 144 and as viewed along a direction parallel to workpiece longitudinal axis 12. As more specific examples, ramp guard radial angle 218 may be at least 10 degrees, at least 30 degrees, at least 50 degrees, at least 70 degrees, at most 90 degrees, at most 80 degrees, at most 60 degrees, at most 40 degrees, and/or at most 20 degrees. In some examples, it may be desirable to configure ramp guard 210 such that ramp guard radial angle 218 is relatively large (e.g., at least 30 degrees) to avoid the formation of a pinch point between ramped surface 214 and mount edge 144 of tool slide mount 142.

Ramp guard 210 may be operatively coupled to tripper pin tower 160 in any of a variety of manners. In some examples, and as schematically illustrated in FIGS. 1-2 and less schematically illustrated at least in FIGS. 6-7, lathe guard system 200 includes a ramp guard mount 220 configured to selectively and operatively couple ramp guard 210 to tripper pin tower 160. In some such examples, each ramp guard mount 220 is configured to permit the corresponding ramp guard 210 to be selectively and operatively coupled to the corresponding tripper pin tower 160 at one of a plurality of radial positions along the tripper pin tower, such as one of a discrete plurality of radial positions along the tripper pin tower. In this manner, ramp guard mount 220 may be configured to selectively and operatively couple ramp guard 210 to tripper pin tower 160 with a degree of adjustability to adjust ramp guard height 212, ramp guard tangent angle 216, and/or ramp guard radial angle 218.

In some examples, ramp guard mount 220 is configured to enable ramp guard 210 to be selectively repositioned relative to tripper pin tower 160 without the use of tools. For example, and as schematically illustrated in FIGS. 1-2 and less schematically illustrated at least in FIG. 9, ramp guard mount 220 may include a spring-loaded mounting pin 222 that is configured to engage tripper pin tower 160 (shown in FIGS. 1-2) to maintain ramp guard mount 220 and ramp guard 210 at a selected position relative to the tripper pin tower. In such examples, spring-loaded mounting pin 222 may facilitate quickly and easily repositioning ramp guard 210 on tripper pin tower 160, such as by manually pulling the spring-loaded mounting pin 222 to remove the spring-loaded mounting pin from engagement with the tripper pin tower and subsequently releasing the spring-loaded mounting pin to re-engage the tripper pin tower via a spring bias. In this manner, and/or in any other appropriate manner, each ramp guard 210 may be selectively and operatively coupled relative to any of a plurality of distinct tripper pin towers 160, and/or to any of a plurality of distinct portable lathes 100, at any suitable location and/or radial position.

While the present disclosure generally relates to examples in which ramp guard 210 is configured to be operatively coupled to tripper pin tower 160, this is not required of all examples of lathe guard system 200. For example, it is additionally within the scope of the present disclosure that ramp guard 210 may be configured to be operatively coupled to any of a variety of components of portable lathe 100 and/or of lathe guard system 200. As more specific examples, ramp guard 210 may be configured to be operatively coupled to fixed ring 110, to ring guard 230, and/or to outer circular surface 102, such as at a location proximate to the corresponding tripper pin tower 160. In such examples, ramp guard 210 may be configured to be operatively coupled to fixed ring 110, to ring guard 230, and/or to outer circular surface 102 in any of a variety of manners, such as via ramp guard mount 220 and/or via a mechanical fastener.

Ring guard 230 also may feature any of a variety of structures and/or configurations for preventing the formation of a pinch point between tool slide mount 142 and tripper pin tower 160, and/or between tool slide mount 142 and drive motor 130, during operative use of portable lathe 100. In some examples, ring guard 230 may be described as defining outer circular surface 102 that otherwise (e.g., in the absence of the ring guard) may be defined by fixed ring 110, thereby effectively reducing or eliminating mount height 146 of tool slide mount 142 relative to a configuration in which the ring guard is not installed on portable lathe 100. Stated differently, by at least partially overlapping each tool slide mount 142 and/or each tripper pin tower 160, ring guard 230 may operate to shrink, cover, and/or or eliminate a region associated with the tool slide mount and/or the tripper pin tower that otherwise may produce a pinch point. Similarly, in some examples, and as schematically illustrated in FIG. 1, ring guard 230 additionally or alternatively may extend at least partially around and/or over drive motor 130, thereby operating to shrink, cover, and/or eliminate a region associated with the drive motor that may produce a pinch point with tool slide mount 142. As a more specific example, FIGS. 3 and 5 illustrate that example portable lathe 1000 is configured such that ring guard 230 overlaps and/or covers a portion of tool slide assembly 140 extending radially away from fixed ring 110, and additionally extends fully around drive motor 130. In some examples, and as schematically illustrated in FIG. 1 and less schematically illustrated at least in FIG. 3, ring guard 230 extends at least substantially around a circumference of portable lathe 100, such as at least substantially circumferentially around fixed ring 110 and/or rotating ring 120.

In some examples, ring guard 230 alone may be sufficient to prevent the formation of pinch points between components coupled to fixed ring 110 and components coupled to rotating ring 120 in applications that utilize smaller tool slide mounts 142 and/or tripper pin towers 160, such as when utilizing portable lathe 100 in conjunction with a relatively small (in diameter) cylindrical workpiece 10. However, in some examples, the combination of ramp guard 210 and ring guard 230 may be described as collectively operating to prevent the formation of pinch points between components coupled to fixed ring 110 and components coupled to rotating ring 120 in applications that utilize larger tool slide mounts and/or tripper pin towers, such as when utilizing portable lathe 100 in conjunction with larger (in diameter) cylindrical workpieces 10. That is, in such examples, the addition of one or more ramp guards 210 may provide additional protection against the formation of pinch points than is provided by ring guard 230 alone. Accordingly, in some examples, and as schematically illustrated in FIGS. 1-2 and less schematically illustrated in FIGS. 3-7, lathe guard system 200 includes one or more ramp guards 210 in combination with ring guard 230, and each ramp guard may be sizes, configured, positioned, etc. as appropriate to accommodate a size of tool slide mount 142 and/or tripper pin tower 160. While the present disclosure generally relates to examples in which each ramp guard 210 is operatively coupled to a respective tripper pin tower 160, this is not required of all examples of lathe guard system 200, and it is additionally within the scope of the present disclosure that each ramp guard may be configured to be operatively coupled to and/or supported by the ring guard.

While the foregoing disclosure generally relates to lathe guard systems 200 for obstructing the formation of pinch points that otherwise could pose an injury hazard, it is additionally within the scope of the present disclosure that portable lathes 100 and/or components utilized in conjunction with the portable lathes may obviate the need for the user to directly interact with the portable lathe during operative use thereof. Specifically, in some examples, and as schematically illustrated in FIGS. 1-2 and 13 and less schematically illustrated in FIGS. 11-12, portable lathe 100 includes, and/or is configured to be operatively utilized in conjunction with, a remote lathe control system 300 for enabling and/or facilitating remote operation of the portable lathe. As schematically illustrated in FIGS. 1-2 and 13 and less schematically illustrated in FIG. 11, remote lathe control system 300 includes an operator pendant 310 configured to receive a user input and to generate a control signal for remote operation of portable lathe 100. Remote lathe control system 300 additionally includes a control tether 318 extending from the operator pendant to convey the control signal to another component of the remote lathe control system and/or of portable lathe 100.

Remote lathe control system 300 may be configured to enable and/or facilitate remote operation and/or control of any of a variety of components of portable lathe 100. For example, operator pendant 310 may be configured to generate a control signal for remotely transitioning one or more tripper pins 164 of portable lathe 100 between the activated configuration and the disabled configuration. Such a configuration thus may enable the user to control a radial position of tool bit 152 while rotating ring 120 rotates without physically approaching a moving component of portable lathe 100 that could pose a safety hazard. In other examples, operator pendant 310 may be configured to generate a control signal for remotely controlling drive motor 130, such as to permit the user to selectively and remotely initiate and cease operation of the drive motor to rotate rotating ring 120 relative to fixed ring 110. Accordingly, and as schematically illustrated in FIGS. 1-2 and 13 and less schematically illustrated in FIG. 11, operator pendant 310 may include a tripper pin activator 312 configured to selectively transition tripper pin(s) 164 between the activated configuration and the disabled configuration, a machine-start control 314 configured to initiate rotation of rotating ring 120, and/or a machine-stop control 316 configured to halt rotation of rotating ring 120.

As used herein, the term "control signal" as used to describe a signal that is conveyed between components of remote lathe control system 300 and/or of portable lathe 100, is intended to refer to any suitable material, property, phenomenon, and/or information for operatively controlling the portable lathe as described herein. For example, the control signal may include and/or be a flow, a flow rate, and/or a pressure of a fluid (such a pneumatic air or a hydraulic fluid) that is conveyed to portable lathe 100. In particular, while the present disclosure generally relates to examples in which the control signal is a pneumatic signal (i.e., a property of a pneumatic air flow), this is not required, and it additionally is within the scope of the present disclosure that the control signal may include and/or be any of a variety of signals and/or flows, examples of which include a hydraulic fluid flow and/or an electrical signal.

In some examples, and as discussed, one or more components of portable lathe 100 (such as drive motor 130) may be pneumatically powered. In such examples, and as schematically illustrated in FIGS. 1-2 and 13 and less schematically illustrated in FIG. 12, portable lathe 100 and/or remote lathe control system 300 additionally may include a pneumatic conditioning unit 320 configured to receive and condition a pneumatic air source, such as via filtering and/or flow control. More specifically, in some examples, and as shown in FIGS. 1-2 and 12-13, pneumatic conditioning unit 320 includes a pneumatic air inlet 326 configured to receive a pneumatic air flow and at least one pneumatic air outlet 330 configured to convey the pneumatic air flow to portable lathe 100. As additionally shown in FIGS. 1-2 and 12-13, pneumatic conditioning unit 320 also may include an operator pendant interface 328 configured to receive the control signal from operator pendant 310 (shown in FIGS. 1-2 and 13). For example, control tether 318 may be configured to be operatively coupled to, and/or to interface with, operator pendant interface 328 to convey the control signal between operator pendant 310 and pneumatic conditioning unit 320. In some examples, and as schematically illustrated in FIGS. 1-2 and 13, remote lathe control system 300 additionally includes one or more pneumatic conduits 340 configured to convey the pneumatic air flow from pneumatic conditioning unit 320 to one or more components of portable lathe 100.

Figure 12:
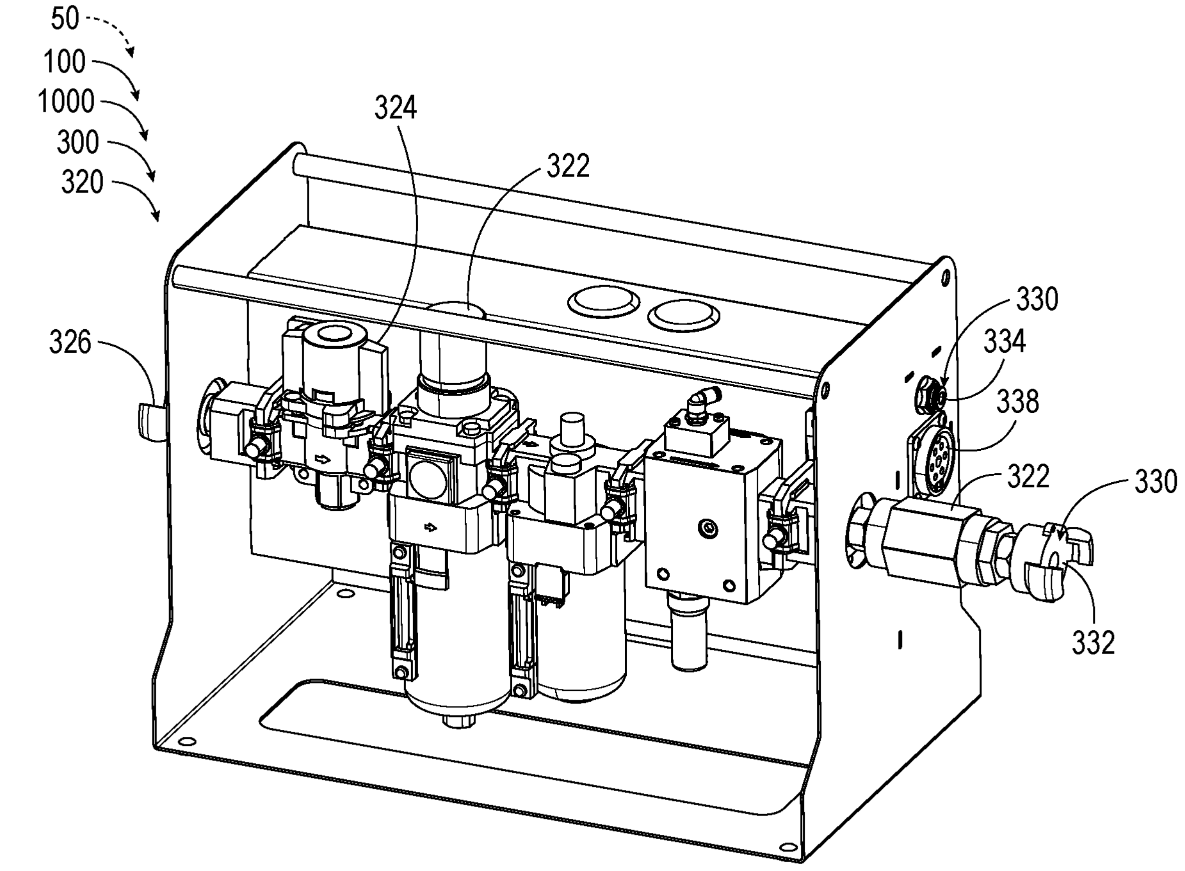
FIG. 12 is a front top-side isometric view of an example of a pneumatic conditioning unit according to the present disclosure.
Figure 13:
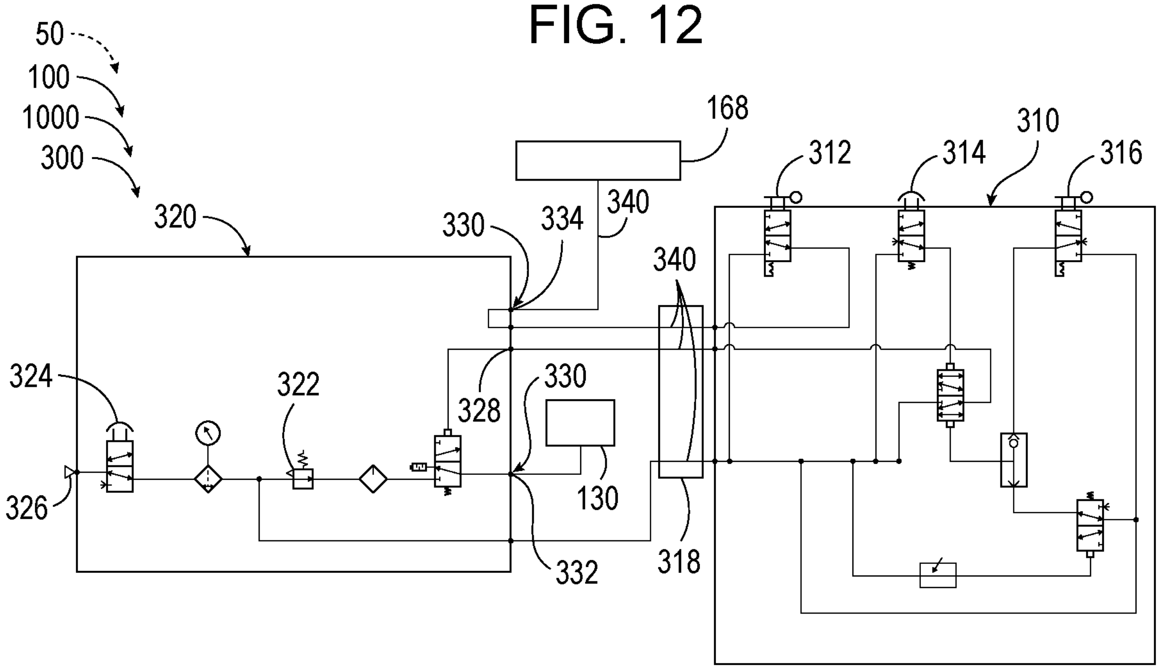
FIG. 13 is a schematic diagram representing an example of a remote lathe control system with an operator pendant and a pneumatic conditioning unit according to the present disclosure.

As additionally schematically illustrated in FIGS. 1-2 and 13 and less schematically illustrated in FIG. 12, pneumatic conditioning unit 320 also may include a flow control valve 322 for selectively modulating a flow rate of the pneumatic air supply, such as to selectively modulate a rotational speed of rotating ring 120 relative to fixed ring 110 during operative use of portable lathe 100. For example, it may be desirable to rotate rotating ring 120 at a slower rate when machining heavy walls, or for more precise cutting after machining weld overlay. Alternatively, it may be desirable to rotate rotating ring 120 at a faster rate for machining harder materials with carbide tooling. In some examples, and as schematically illustrated in FIGS. 1-2 and 13 and less schematically illustrated in FIG. 12, pneumatic conditioning unit 320 includes a lockout valve 324 configured to interrupt a flow of pneumatic air to drive motor 130, such as to cease rotation of rotating ring 120 relative to fixed ring 110. In such examples, lockout valve 324 may be configured to be selectively transitioned between a flow state, in which the pneumatic air flow may flow from pneumatic air inlet 326 to pneumatic air outlet(s) 330, and a lockout state, in which the pneumatic air flow is restricted from reaching the pneumatic air outlet(s).

Each pneumatic air outlet 330 may be configured to convey the pneumatic air flow to any of a variety of respective components of portable lathe 100. For example, and as schematically illustrated in FIGS. 1-2 and 13 and less schematically illustrated in FIG. 12, in an example in which drive motor 130 (shown in FIGS. 1-2 and 13) is a pneumatic motor, at least one pneumatic air outlet 330 may include and/or be a drive air outlet 332 that is configured to convey the pneumatic air flow to the drive motor via a corresponding pneumatic conduit 340. Accordingly, in such examples, machine-start control 314 of operator pendant 310 may be configured to enable the user to selectively initiate and/or resume a flow of pneumatic air from drive air outlet 332 to drive motor 130. In some such examples, flow control valve 322 is configured to enable selective variation of a flow rate and/or a pressure of the pneumatic air that is supplied to drive motor 130 via drive air outlet 332. In this manner, the control signal generated by operator pendant 310 may be described as being configured to regulate the pneumatic air flow to drive motor 130 to selectively rotate rotating ring 120 relative to fixed ring 110, such as at a desired rotation rate.

As another example, at least one pneumatic air outlet 330 may be configured to enable remote actuation of a respective tripper pin 164 between the activated configuration and the disabled configuration. In particular, in some examples, and as shown in FIGS. 1-2 and less schematically illustrated at least in FIGS. 6-8, at least one tripper pin tower 160 includes a tripper actuator 168 that is configured to selectively transition the respective tripper pin 164 between the activated configuration and the disabled configuration in response to the control signal, such as the pneumatic air flow. In some such examples, and as schematically illustrated in FIGS. 1-2 and less schematically illustrated at least in FIGS. 6-8, tripper actuator 168 includes a tripper actuation remote input 170 configured to receive the control signal for actuating tripper actuator 168.

In some examples, such as in example portable lathe 1000 described and illustrated herein, tripper actuator 168 is a pneumatic actuator that operates in response to the control signal in the form of the pneumatic air flow. Accordingly, in such examples, and as schematically illustrated in FIGS. 1-2, tripper actuation remote input 170 includes and/or is a pneumatic air inlet configured to be operatively coupled to a corresponding pneumatic conduit 340 for receiving the pneumatic air flow. Accordingly, in an example in which tripper actuator 168 is a pneumatic actuator, and as schematically illustrated in FIGS. 1-2 and 13 and less schematically illustrated in FIG. 12, at least one pneumatic air outlet 330 of pneumatic conditioning unit 320 may include and/or be a tripper air outlet 334 that is configured to convey the pneumatic air flow to tripper pin tower 160, to tripper actuator 168, and/or to tripper actuation remote input 170 via a corresponding pneumatic conduit 340. In this manner, the control signal generated by operator pendant 310 may be described as being configured to regulate the pneumatic air flow to tripper pin tower 160 and/or a component thereof to selectively transition tripper pin 164 between the activated configuration and the disabled configuration.

In some examples, tripper actuator 168 may be biased to position tripper pin 164 in the disabled configuration, such that the tripper pin is in the disabled configuration when the pneumatic air flow supplied to the tripper actuator is below a threshold pneumatic pressure, and such that the tripper pin is in the activated configuration when the pneumatic air flow supplied to the tripper actuator is at least equal to the threshold pneumatic pressure. Alternatively, in other examples, tripper actuator 168 may be biased to position tripper pin 164 in the activated configuration. While the present disclosure generally relates to examples in which tripper actuator 168 is a pneumatic actuator, this is not required, and it is additionally within the scope of the present disclosure that tripper actuator 168 may include and/or be any of a variety of actuators, examples of which include a hydraulic actuator and an electrical actuator. Similarly, tripper actuation remote input 170 may be configured to receive the control signal in any of a variety of forms other than pneumatic air pressure. As examples, tripper actuation remote input 170 also may include and/or be a hydraulic fluid inlet and/or an electrical interface.

FIG. 13 is a schematic pneumatic circuit diagram illustrating an example of operator pendant 310 that interfaces with pneumatic conditioning unit 320 via control tether 318. That is, in the example of FIG. 13, control tether 318 is configured to convey the control signal in the form of pneumatic pressure and/or air flow between operator pendant 310 and pneumatic conditioning unit 320, such as via one or more pneumatic conduits 340. FIG. 13 additionally illustrates an example in which pneumatic conditioning unit 320 supplies pneumatic pressure to drive motor 130 and to tripper actuator 168. In this manner, the control signal produced by operator pendant 310 may be configured to regulate the supply of pneumatic pressure to drive motor 130 to selectively rotate rotating ring 120 and/or the supply of pneumatic pressure to tripper actuator 168 to selectively transition tripper pin 164 between the activated configuration and the disabled configuration.

While the pneumatic circuit diagram of FIG. 13 pertains to an example in which the control signal takes the form of a pneumatic pressure signal, this is not required, and it additionally is within the scope of the present disclosure that the control signal may include and/or be any appropriate signal, such as an electrical control signal. In such examples, the electrical control signal may be conveyed from operator pendant 310 to an electrical control module, such as may control the operation of drive motor 130 and/or an actuator associated with each tripper pin tower 160.

In some examples, remote lathe control system 300, operator pendant 310, and/or pneumatic conditioning unit 320 may be configured to prevent an inadvertent and/or unexpected rotation of rotating ring 120. For example, when drive motor 130 is pneumatically powered, operation of portable lathe 100 may be inadvertently ceased by an interruption in the supply of pneumatic pressure from pneumatic conditioning unit 320 to drive motor 130, such as by pinching pneumatic conduit 340 upstream of pneumatic air inlet 326. In some prior art examples, when the flow in the pneumatic air hose is reestablished subsequent to such an inadvertent interruption, drive motor 130 may unexpectedly resume rotation of rotating ring 120, introducing a risk of injury to a user positioned near the rotating ring. Accordingly, remote lathe control system 300 may be configured such that, after an interruption of pneumatic pressure supplied to pneumatic conditioning unit 320, the supply of pneumatic pressure to drive motor 130 may be reestablished only via selective and deliberate user input, such as via machine-start control 314 of operator pendant 310.

More specifically, in some examples, operator pendant 310 is configured to be transitioned between a running configuration, in which the control signal operates to direct the pneumatic air flow from pneumatic air inlet 326 to drive air outlet 332, and a stopped configuration, in which the control signal operates to restrict the pneumatic air flow from flowing through the drive air outlet. In such examples, machine-start control 314 may be configured to receive a user input to selectively transition operator pendant 310 from the stopped configuration to the running configuration, and machine-stop control 316 may be configured to receive a user input to selectively transition the operator pedant from the running configuration to the stopped configuration. In such examples, operator pendant 310 also may be configured to automatically transition from the running configuration to the stopped configuration when the pneumatic airflow into pneumatic air inlet 326 is interrupted, and to remain in the stopped configuration until a user subsequently selectively operates machine-start control 314. Stated differently, in such examples, operator pendant 310 may be configured to transition from the stopped configuration to the running configuration only when the pneumatic air flow into pneumatic air inlet 326 is reestablished and when machine-start control 314 is operated to transition operator pendant 310 to the running configuration. In such examples, operator pendant 310 may be described as exhibiting a low-pressure safety dropout functionality.

The foregoing discussion generally relates to examples and instances in which portable lathe 100 is operatively installed on cylindrical workpiece 10. Stated differently, the above descriptions generally correspond to configurations in which portable lathe 100 has been operatively installed on cylindrical workpiece 10 such that portable lathe 100 is positioned and operative to machine exterior surface 14 of cylindrical workpiece 10. Accordingly, the above discussion generally relates to structures and mechanisms of portable lathe 100 corresponding to the functionality of machining exterior surface 14 of cylindrical workpiece 10. However, portable lathe 100 further may include structures, mechanisms, and/or configurations corresponding to the portable nature of portable lathe 100, such as structures, mechanisms, and/or features that facilitate operatively installing and/or assembling portable lathe 100 on cylindrical workpiece 10. Stated differently, portable lathe 100 may include one or more structures, mechanisms, and/or features configured to facilitate transporting portable lathe 100 to a location of cylindrical workpiece 10 and/or to facilitate assembly and/or installation of portable lathe 100 by an end user. In this manner, and as shown in FIGS. 1-13, portable lathe 100, lathe guard system 200, and/or remote lathe control system 300 also may be described as being a portion of, and/or an assembled version of, a portable lathe assembly kit 50 that includes the components of portable lathe 100, of lathe guard system 200, and/or of remote lathe control system 300. Stated differently, the present disclosure also may be described as being directed to portable lathe assembly kits 50 that include at least a portion of portable lathe 100, of lathe guard system 200, and/or of remote lathe control system 300, and/or that facilitate operative installation and/or use of portable lathe 100 in conjunction with cylindrical workpiece 10.

In some examples, one or more components of portable lathe 100 each may include a plurality of portions that are configured to be operatively assembled around cylindrical workpiece 10. As an example, and as schematically illustrated in FIGS. 1-2 and less schematically illustrated at least in FIGS. 4-6, fixed ring 110 may include a fixed ring first portion 112 and a fixed ring second portion 114 that are configured to be selectively and operatively coupled to one another during operative use of portable lathe 100, such as by a fixed ring coupling mechanism 116 (shown in FIGS. 1, 4, and 6). In such examples, fixed ring first portion 112 and fixed ring second portion 114 may be configured to be selectively and repeatedly coupled to one another and removed from one another. Similarly, in some examples, and as schematically illustrated in FIGS. 1-2 and less schematically illustrated at least in FIGS. 3 and 5, rotating ring 120 includes a rotating ring first portion 122 and a rotating ring second portion 124 that are configured to be selectively and operatively coupled to one another during operative use of portable lathe 100, such as by a rotating ring coupling mechanism 126 (shown in FIGS. 1-2). In such examples, rotating ring first portion 122 and rotating ring second portion 124 may be configured to be selectively and repeatedly coupled to one another (and/or to fixed ring 110) and removed from one another (and/or from the fixed ring). When present, fixed ring coupling mechanism 116 and/or rotating ring coupling mechanism 126 each may include and/or be any of a variety of coupling devices, examples of which include a bolt, a swinging bolt, a mechanical fastener, a threaded fastener, etc.

In some examples, ring guard 230 includes a plurality of distinct components that are operatively assembled upon portable lathe 100 to form the ring guard. For example, and as schematically illustrated in FIGS. 1-2 and less schematically illustrated at least in FIGS. 3 and 5-6, ring guard 230 may include a ring guard first portion 232 and a ring guard second portion 234 that are configured to be independently, selectively and operatively coupled to fixed ring 110 to assemble ring guard 230. In some examples, and as perhaps best illustrated in FIG. 6, ring guard 230 (and/or each of ring guard first portion 232 and ring guard second portion 234 thereof) is fixedly coupled to fixed ring 110 during operative use of portable lathe 100, such as by bolting the ring guard or portion thereof to the fixed ring. In such examples, ring guard first portion 232 and ring guard second portion 234 each may be configured to be selectively and repeatedly coupled to and uncoupled from fixed ring 110.

Illustrative, non-exclusive examples of inventive subject matter according to the present disclosure are described in the following enumerated paragraphs:

A1. A lathe guard system for a portable lathe that includes a fixed ring configured to be fixedly mounted on a cylindrical workpiece that extends along a workpiece longitudinal axis, a rotating ring rotatably and operatively coupled to the fixed ring, a tool slide assembly mounted to the rotating ring and including a tool bit, and a tripper pin tower fixedly coupled to and extending radially away from the fixed ring and including a tripper pin, the lathe guard system comprising one or both of:

(i) a ramp guard configured to be operatively mounted proximate to the tripper pin tower to prevent formation of a pinch point between the tripper pin tower and the tool slide assembly as the rotating ring rotates relative to the fixed ring during operative use of the portable lathe; wherein the ramp guard includes a ramped surface extending at least partially oblique to an outer circular surface of the portable lathe during operative use of the portable lathe; and optionally wherein the ramp guard is configured to be operatively coupled to one or more of the tripper pin tower, the fixed ring, and the outer circular surface during operative use of the portable lathe; and (ii) a ring guard that is configured to be operatively coupled to one of the fixed ring or the rotating ring; wherein the ring guard extends radially outward relative to the fixed ring and at least partially overlaps the tool slide assembly to prevent the formation of a pinch point between the tripper pin tower and the tool slide assembly as the rotating ring rotates relative to the fixed ring during operative use of the portable lathe.

A2. The lathe guard system of paragraph A1, wherein the portable lathe is configured such that, during operative use of the portable lathe, the rotating ring rotates relative to the fixed ring about the workpiece longitudinal axis to move the tool bit across an exterior surface of the cylindrical workpiece to machine the cylindrical workpiece.

A3. The lathe guard system of any of paragraphs A1-A2, wherein the portable lathe further includes a drive motor configured to rotate the rotating ring relative to the fixed ring during operative use of the portable lathe.

A4. The lathe guard system of paragraph A3, wherein the drive motor includes, and optionally is, one or more of a pneumatic motor, an electric motor, and a hydraulic motor.

A5. The lathe guard system of any of paragraphs A1-A4, wherein the fixed ring defines the outer circular surface.

A6. The lathe guard system of any of paragraphs A1-A5, wherein the rotating ring is at least partially enclosed by the fixed ring.

A7. The lathe guard system of any of paragraphs A1-A6, wherein the rotating ring is positioned radially inward of at least a portion of the fixed ring.

A8. The lathe guard system of any of paragraphs A1-A7, wherein the fixed ring includes a fixed ring first portion and a fixed ring second portion that are configured to be selectively and operatively coupled to one another during operative use of the portable lathe.

A9. The lathe guard system of paragraph A8, wherein the fixed ring includes a fixed ring coupling mechanism configured to selectively and operatively couple the fixed ring first portion and the fixed ring second portion to one another to at least partially assemble the portable lathe around the cylindrical workpiece.

A10. The lathe guard system of any of paragraphs A1-A9, wherein the rotating ring includes a rotating ring first portion and a rotating ring second portion that are configured to be selectively and operatively coupled to one another during operative use of the portable lathe.

A11. The lathe guard system of paragraph A10, wherein the rotating ring includes a rotating ring coupling mechanism configured to selectively and operatively couple the rotating ring first portion and the rotating ring second portion to one another to at least partially assemble the portable lathe around the cylindrical workpiece.

A12. The lathe guard system of any of paragraphs A1-A11, wherein the portable lathe further includes a plurality of locator pads operatively coupled to the fixed ring and configured to engage the cylindrical workpiece to mount the portable lathe on the cylindrical workpiece during operative use of the portable lathe.

A13. The lathe guard system of paragraph A12, wherein the plurality of locator pads includes a plurality of extension pads configured to be arranged in a stacked configuration to adjust a position of the cylindrical workpiece relative to the fixed ring.

A14. The lathe guard system of any of paragraphs A1-A13, wherein the tool slide assembly includes:
- a tool slide mount operatively coupled to the rotating ring; and
- a tool slide adjustably supported by the tool slide mount;

wherein the tool bit is fixedly coupled to the tool slide.

A15. The lathe guard system of paragraph A14, wherein the tool slide is configured to be selectively radially translated relative to the tool slide mount to adjust a radial position of the tool bit relative to the cylindrical workpiece during operative use of the portable lathe.

A16. The lathe guard system of paragraph A15, wherein the tool slide assembly further includes a star wheel rotatably coupled to the tool slide mount; wherein rotating the star wheel operates to radially translate the tool slide relative to the tool slide mount, and wherein the tripper pin is configured to be selectively transitioned between an activated configuration, in which the tripper pin is positioned to engage and rotate the star wheel as the tool slide assembly moves past the tripper pin tower during operative use of the portable lathe, and a disabled configuration, in which the tripper pin is positioned to be spaced apart from the star wheel when the tool slide assembly moves past the tripper pin tower during operative use of the portable lathe.

A17. The lathe guard system of paragraph A16, wherein the tripper pin is configured to pivot relative to the tripper pin tower to transition between the activated configuration and the disabled configuration.

A18. The lathe guard system of any of paragraphs A16-A17, wherein the tripper pin tower includes a tripper activation lever that is configured to be selectively actuated by a user to selectively transition the tripper pin between the activated configuration and the disabled configuration.

A19. The lathe guard system of any of paragraphs A16-A18, wherein the tripper pin tower includes a tripper actuator that is configured to selectively transition the tripper pin between the activated configuration and the disabled configuration in response to a control signal; optionally wherein the tripper actuator includes, and optionally is, one or more of a pneumatic actuator, a hydraulic actuator, and an electrical actuator.

A20. The lathe guard system of paragraph A19, wherein the tripper actuator includes a tripper actuation remote input configured to receive the control signal; optionally wherein the tripper actuation remote input includes one or more of a pneumatic air inlet, a hydraulic fluid inlet, and an electrical interface.

A21. The lathe guard system of any of paragraphs A1-A20, wherein the tool bit includes one or more of a cutting edge, a single-point cutting tool, a chiseled cutting tool, and a lathe tool bit.

A22. The lathe guard system of any of paragraphs A1-A21, wherein a/the tool slide mount includes a mount edge that extends radially away from the outer circular surface by a mount height, as measured between the outer circular surface and an outer extremity of the mount edge along a direction perpendicular to the workpiece longitudinal axis; and wherein the ramp guard extends radially away from the outer circular surface by a ramp guard height, as measured between the outer circular surface and an outer extremity of the ramp guard along a direction perpendicular to the workpiece longitudinal axis, that is equal to or greater than the mount height.

A23. The lathe guard system of any of paragraphs A1-A22, wherein the tripper pin tower extends radially away from the outer circular surface by a tower height, as measured between the outer circular surface and an outer extremity of the tripper pin tower along a direction perpendicular to the workpiece longitudinal axis; and wherein the ramp guard extends radially away from the outer circular surface by a/the ramp guard height; and wherein the ramp guard height is equal to or greater than the tower height.

A24. The lathe guard system of paragraph A23 when dependent from paragraph A22, wherein the ramp guard height is equal to or greater than the smaller of the mount height and the tower height.

A25. The lathe guard system of any of paragraphs A1-A24, wherein the ramped surface of the ramp guard forms a ramp guard tangent angle with the outer circular surface, as measured between a line tangent to the ramped surface and a line tangent to the outer circular surface and as viewed along a direction parallel to the workpiece longitudinal axis, that is one or more of at least 100 degrees, at least 120 degrees, at least 140 degrees, at least 160 degrees, at most 180 degrees, at most 170 degrees, at most 150 degrees, at most 130 degrees, and at most 110 degrees.

A26. The lathe guard system of any of paragraphs A1-A25, wherein the ramped surface of the ramp guard forms a ramp guard radial angle with a/the mount edge of a/the tool slide mount as the tool slide mount moves past the ramp guard during operative use of the portable lathe, as measured between a line tangent to the ramped surface and a line tangent to the mount edge and as viewed along a direction parallel to the workpiece longitudinal axis; and wherein the ramp guard radial angle is one or more of at least 10 degrees, at least 30 degrees, at least 50 degrees, at least 70 degrees, at most 90 degrees, at most 80 degrees, at most 60 degrees, at most 40 degrees, and at most 20 degrees.

A27. The lathe guard system of any of paragraphs A1-A26, further comprising a ramp guard mount configured to selectively and operatively couple the ramp guard to the tripper pin tower.

A28. The lathe guard system of paragraph A27, wherein the ramp guard mount is configured to permit the ramp guard to be selectively and operatively coupled to the tripper pin tower at one of a plurality of radial positions along the tripper pin tower, optionally one of a discrete plurality of radial positions along the tripper pin tower.

A29. The lathe guard system of any of paragraphs A27-A28, wherein the ramp guard mount is configured to enable the ramp guard to be selectively repositioned relative to the tripper pin tower without use of tools.

A30. The lathe guard system of any of paragraphs A27-A29, wherein the ramp guard mount includes a spring-loaded mounting pin that is configured to engage the tripper pin tower to maintain the ramp guard mount at a selected position relative to the tripper pin tower.

A31. The lathe guard system of any of paragraphs A1-A30, wherein the ring guard defines the outer circular surface.

A32. The lathe guard system of any of paragraphs A1-A31, wherein the ring guard extends at least substantially around a full circumference of the portable lathe.

A33. The lathe guard system of any of paragraphs A1-A32, wherein the ring guard extends at least partially around a/the drive motor.

A34. The lathe guard system of any of paragraphs A1-A33, wherein the ring guard is fixedly coupled to the fixed ring during operative use of the portable lathe.

A35. The lathe guard system of any of paragraphs A1-A34, wherein the ring guard includes a ring guard first portion and a ring guard second portion that are configured to be independently, selectively and operatively coupled to the fixed ring to assemble the ring guard.

A36. The lathe guard system of any of paragraphs A1-A35, wherein the ramp guard is configured to be operatively coupled to the ring guard during operative use of the portable lathe.

A37. The lathe guard system of any of paragraphs A1-A36 in combination with the portable lathe.

B1. A remote lathe control system for a portable lathe that includes a fixed ring configured to be fixedly mounted on a cylindrical workpiece, a rotating ring rotatably and operatively coupled to the fixed ring, a drive motor configured to rotate the rotating ring relative to the fixed ring, a tool slide assembly mounted to the rotating ring and including a tool bit and a star wheel, and a tripper pin tower fixedly coupled to and extending radially away from the fixed ring and including a tripper pin, the remote lathe control system comprising:

an operator pendant configured to receive a user input from a human user and to generate a control signal for remote operation of the portable lathe; and a control tether extending from the operator pendant to convey the control signal to another component of the remote lathe control system.

B2. The remote lathe control system of paragraph B1, wherein the control signal is configured to permit the user to selectively and remotely transition the tripper pin between an activated configuration, in which the tripper pin is positioned to engage and rotate the star wheel as the tool slide assembly moves past the tripper pin tower, and a disabled configuration, in which the tripper pin is positioned to be spaced apart from the star wheel when the tool slide assembly moves past the tripper pin tower.

B3. The remote lathe control system of any of paragraphs B1-B2, wherein the control signal is configured to permit the user to selectively and remotely initiate and cease operation of the drive motor to rotate the rotating ring relative to the fixed ring.

B4. The remote lathe control system of any of paragraphs B1-B3, wherein the portable lathe is the portable lathe of any of paragraphs A1-A37.

B5. The remote lathe control system of any of paragraphs B1-B4, wherein the control signal includes one or more of a pneumatic air flow, a hydraulic fluid flow, and an electrical signal.

B6. The remote lathe control system of any of paragraphs B1-B5, wherein the operator pendant includes one or more of:

(i) a tripper pin activator configured to selectively transition the tripper pin between a/the activated configuration and a/the disabled configuration;

(ii) a machine-start control configured to initiate rotation of the rotating ring relative to the) fixed ring; and (iii) a machine-stop control configured to halt rotation of the rotating ring relative to the fixed ring.

B7. The remote lathe control system of any of paragraphs B1-B6, further comprising a pneumatic conditioning unit configured to receive and condition a pneumatic air source.

B8. The remote lathe control system of paragraph B7, wherein the pneumatic conditioning unit includes:

a pneumatic air inlet configured to receive a/the pneumatic air flow;

at least one pneumatic air outlet configured to convey the pneumatic air flow to the portable lathe; and an operator pendant interface configured to receive the control signal from the operator pendant.

B9. The remote lathe control system of paragraph B8, wherein the control signal includes, and optionally is, at least a portion of the pneumatic air flow.

B10. The remote lathe control system of any of paragraphs B8-B9, wherein the at least one pneumatic air outlet includes one or both of:

a drive air outlet configured to convey the pneumatic air flow to the drive motor; and a tripper air outlet configured to convey the pneumatic air flow to the tripper pin tower, optionally to a/the tripper actuator, optionally to a/the tripper actuation remote input.

B11. The remote lathe control system of any of paragraphs B7-B10, wherein the control tether is configured to be operatively coupled to an/the operator pendant interface to convey the control signal between the operator pendant and the pneumatic conditioning unit; optionally from the operator pendant to the pneumatic conditioning unit.

B12. The remote lathe control system of any of paragraphs B7-B11, wherein the pneumatic conditioning unit includes a flow control valve configured to selectively modulate one or both of a flow rate of a/the pneumatic air flow and a pressure of the pneumatic air flow to selectively modulate a rotational speed of the rotating ring relative to the fixed ring during operative use of the portable lathe.

B13. The remote lathe control system of any of paragraphs B7-B12, wherein the pneumatic conditioning unit includes a lockout valve configured to interrupt a flow of pneumatic air to the drive motor to cease rotation of the rotating ring relative to the fixed ring.

B14. The remote lathe control system of paragraph B13, wherein the lockout valve is configured to be transitioned between a flow state, in which a/the pneumatic air flow may flow from a/the pneumatic air inlet to a/the pneumatic air outlet, and a lockout state, in which the pneumatic air flow is restricted from reaching the pneumatic air outlet.

B15. The remote lathe control system of any of paragraphs B1-B14, wherein the control signal is configured to regulate one or more of:

(i) a/the pneumatic air flow to the drive motor to selectively rotate the rotating ring relative to the fixed ring; and (ii) a/the pneumatic air flow to the tripper pin tower to selectively transition the tripper pin between an/the activated configuration and a/the disabled configuration.

B16. The remote lathe control system of any of paragraphs B1-B15, wherein the operator pendant is configured to be transitioned between a running configuration, in which the control signal operates to direct a/the pneumatic air flow from a/the pneumatic air inlet to a/the at least one pneumatic air outlet, optionally to a/the drive air outlet, and a stopped configuration, in which the control signal operates to restrict the pneumatic air flow from flowing to the drive air outlet.

B17. The remote lathe control system of paragraph B16, wherein a/the machine-start control is configured to receive a user input to selectively transition the operator pendant from the stopped configuration to the running configuration.

B18. The remote lathe control system of any of paragraphs B16-B17, wherein a/the machine-stop control is configured to receive a/the user input to selectively transition the operator pendant from the running configuration to the stopped configuration.

B19. The remote lathe control system of any of paragraphs B16-B18, wherein the operator pendant is configured to automatically transition from the running configuration to the stopped configuration when the pneumatic air flow into the pneumatic air inlet is interrupted; and wherein the operator pendant is configured to transition from the stopped configuration to the running configuration only when both of:

(i) the pneumatic air flow into the pneumatic air inlet is reestablished; and (ii) the machine-start control is operated to transition the operator pendant from the stopped configuration to the running configuration.

B20. The remote lathe control system of any of paragraphs B1-B19, further comprising one or more pneumatic conduits configured to convey a/the pneumatic air flow from a/the pneumatic conditioning unit to one or both of the drive motor and a/the tripper actuator.

B21. The remote lathe control system of paragraph B20, wherein at least one pneumatic conduit of the one or more pneumatic conduits is configured to be selectively and operatively coupled to a/the tripper actuation remote input during operative use of the portable lathe.

B22. The remote lathe control system of any of paragraphs B1-B21, in combination with the portable lathe.

C1. A portable lathe assembly kit, comprising:

a portable lathe configured to machine an exterior surface of a cylindrical workpiece; and one or both of:

(i) the lathe guard system of any of paragraphs A1-A37; and (ii) the remote lathe control system of any of paragraphs 131-1322.

C2. The portable lathe assembly kit of paragraph C1, wherein the portable lathe is the portable lathe of any of paragraphs A1-A37 or of any of paragraphs 131-1322.

C3. The portable lathe assembly kit of any of paragraphs C1-C2, wherein the portable lathe assembly kit is configured to be operatively installed upon the cylindrical workpiece by an end user.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first component that extends at least substantially around a second component includes a first component that extends around at least 75% of a circumference of the second component and also includes a first component that extends fully circumferentially around the second component.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The various disclosed elements of apparatuses disclosed herein are not required to all apparatuses according to the present disclosure, and the present disclosure includes all novel and non-obvious combinations and subcombinations of the various elements disclosed herein. Moreover, one or more of the various elements disclosed herein may define independent inventive subject matter that is separate and apart from the whole of a disclosed apparatus. Accordingly, such inventive subject matter is not required to be associated with the specific apparatuses that are expressly disclosed herein, and such inventive subject matter may find utility in apparatuses and/or methods that are not expressly disclosed herein.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A remote lathe control system for a portable lathe that includes a fixed ring configured to be fixedly mounted on a cylindrical workpiece, a rotating ring rotatably and operatively coupled to the fixed ring, a drive motor configured to rotate the rotating ring relative to the fixed ring, a tool slide assembly mounted to the rotating ring and including a tool bit and a star wheel, and a tripper pin tower fixedly coupled to and extending radially away from the fixed ring and including a tripper pin, the remote lathe control system comprising:

- an operator pendant configured to receive a user input from a human user and to generate a control signal for remote operation of the portable lathe;
- a control tether extending from the operator pendant to convey the control signal to another component of the remote lathe control system; and
- a pneumatic conditioning unit including:
  - a pneumatic air inlet configured to receive a pneumatic air flow;
  - at least one pneumatic air outlet configured to convey the pneumatic air flow to the portable lathe; and an operator pendant interface configured to receive the control signal from the operator pendant.

2. The remote lathe control system of claim 1, wherein the operator pendant is configured to permit the user to remotely transition the tripper pin between an activated configuration, in which the tripper pin is positioned to engage and rotate the star wheel as the tool slide assembly moves past the tripper pin tower, and a disabled configuration, in which the tripper pin is positioned to be spaced apart from the star wheel when the tool slide assembly moves past the tripper pin tower.

3. The remote lathe control system of claim 1, wherein the operator pendant is configured to permit the user to remotely initiate and cease operation of the drive motor to rotate the rotating ring relative to the fixed ring.

4. The remote lathe control system of claim 1, wherein the control signal is a pneumatic signal.

5. The remote lathe control system of claim 1, wherein the operator pendant includes one or more of:

(i) a tripper pin activator configured to transition the tripper pin between an activated configuration, in which the tripper pin is positioned to engage and rotate the star wheel as the tool slide assembly moves past the tripper pin tower, and a disabled configuration, in which the tripper pin is positioned to be spaced apart from the star wheel when the tool slide assembly moves past the tripper pin tower;

(ii) a machine-start control configured to initiate rotation of the rotating ring relative to the fixed ring; and (iii) a machine-stop control configured to halt rotation of the rotating ring relative to the fixed ring.

6. The remote lathe control system of claim 1, wherein the at least one pneumatic air outlet includes one or both of:

a drive air outlet configured to convey the pneumatic air flow to the drive motor; and a tripper air outlet configured to convey the pneumatic air flow to the tripper pin tower.

7. The remote lathe control system of claim 1, wherein the control tether is configured to be operatively coupled to the operator pendant interface to convey the control signal between the operator pendant and the pneumatic conditioning unit.

8. The remote lathe control system of claim 1, wherein the pneumatic conditioning unit includes a flow control valve configured to modulate one or both of a flow rate of the pneumatic air flow and a pressure of the pneumatic air flow to modulate a rotational speed of the rotating ring relative to the fixed ring during operative use of the portable lathe.

9. The remote lathe control system of claim 1, wherein the pneumatic conditioning unit includes a lockout valve configured to interrupt a flow of pneumatic air to the drive motor to cease rotation of the rotating ring relative to the fixed ring.

10. The remote lathe control system of claim 9, wherein the lockout valve is configured to be transitioned between a flow state, in which the pneumatic air flow may flow from the pneumatic air inlet to the at least one pneumatic air outlet, and a lockout state, in which the pneumatic air flow is restricted from reaching the at least one pneumatic air outlet.

11. The remote lathe control system of claim 1, wherein the control signal is configured to regulate one or more of:

(i) a pneumatic air flow to the drive motor to rotate the rotating ring relative to the fixed ring; and (ii) a pneumatic air flow to the tripper pin tower to transition the tripper pin between an activated configuration, in which the tripper pin is positioned to engage and rotate the star wheel as the tool slide assembly moves past the tripper pin tower, and a disabled configuration, in which the tripper pin is positioned to be spaced apart from the star wheel when the tool slide assembly moves past the tripper pin tower.

12. The remote lathe control system of claim 1 in combination with the portable lathe.

13. A remote lathe control system for a portable lathe that includes a fixed ring configured to be fixedly mounted on a cylindrical workpiece, a rotating ring rotatably and operatively coupled to the fixed ring, a drive motor configured to rotate the rotating ring relative to the fixed ring, a tool slide assembly mounted to the rotating ring and including a tool bit and a star wheel, and a tripper pin tower fixedly coupled to and extending radially away from the fixed ring and including a tripper pin, the remote lathe control system comprising:

an operator pendant configured to receive a user input from a human user and to generate a control signal for remote operation of the portable lathe;

a control tether extending from the operator pendant to convey the control signal to another component of the remote lathe control system; and a pneumatic conditioning unit including:

a pneumatic air inlet configured to receive a pneumatic air flow; and at least one pneumatic air outlet configured to convey the pneumatic air flow to the portable lathe;

wherein the operator pendant is configured to be transitioned between a running configuration, in which the control signal operates to direct the pneumatic air flow from the pneumatic air inlet to the at least one pneumatic air outlet, and a stopped configuration, in which the control signal operates to restrict the pneumatic air flow from flowing to a drive air outlet.

14. The remote lathe control system of claim 13, wherein the operator pendant includes a machine-start control configured to initiate rotation of the rotating ring relative to the fixed ring, and wherein the machine-start control is configured to receive a user input to transition the operator pendant from the stopped configuration to the running configuration.

15. The remote lathe control system of claim 14, wherein the operator pendant is configured to automatically transition from the running configuration to the stopped configuration when the pneumatic air flow into the pneumatic air inlet is interrupted; and wherein the operator pendant is configured to transition from the stopped configuration to the running configuration only when both of:

(i) the pneumatic air flow into the pneumatic air inlet is reestablished; and (ii) the machine-start control is operated to transition the operator pendant from the stopped configuration to the running configuration.

16. The remote lathe control system of claim 13, wherein the operator pendant includes a machine-start control configured to initiate rotation of the rotating ring relative to the fixed ring, and a machine-stop control is configured to receive a user input to transition the operator pendant from the running configuration to the stopped configuration.

17. The remote lathe control system of claim 13 in combination with the portable lathe.

18. A remote lathe control system for a portable lathe that includes a fixed ring configured to be fixedly mounted on a cylindrical workpiece, a rotating ring rotatably and operatively coupled to the fixed ring, a drive motor configured to rotate the rotating ring relative to the fixed ring, a tool slide assembly mounted to the rotating ring and including a tool bit and a star wheel, and a tripper pin tower fixedly coupled to and extending radially away from the fixed ring and including a tripper pin, the remote lathe control system comprising:

an operator pendant configured to receive a user input from a human user and to generate a control signal for remote operation of the portable lathe; and a control tether extending from the operator pendant to convey the control signal to another component of the remote lathe control system; and a pneumatic conditioning unit including a lockout valve configured to interrupt a flow of pneumatic air to the drive motor to cease rotation of the rotating ring relative to the fixed ring.

19. The remote lathe control system of claim 18, wherein the pneumatic conditioning unit includes:

a pneumatic air inlet configured to receive a pneumatic air flow; and at least one pneumatic air outlet configured to convey the pneumatic air flow to the portable lathe;

wherein the lockout valve is configured to be transitioned between a flow state, in which the pneumatic air flow may flow from the pneumatic air inlet to the at least one pneumatic air outlet, and a lockout state, in which the pneumatic air flow is restricted from reaching the at least one pneumatic air outlet.

20. The remote lathe control system of claim 18 in combination with the portable lathe.

* * * * *